(12) United States Patent
Kajiyama et al.

(10) Patent No.: US 7,445,841 B1
(45) Date of Patent: Nov. 4, 2008

(54) POLYLACTIC ACID RESIN, TEXTILE PRODUCTS OBTAINED THEREFROM, AND PROCESSES FOR PRODUCING TEXTILE PRODUCTS

(75) Inventors: Hiroshi Kaijiyama, Hofu (JP); Hideo Ueda, Hofu (JP); Hiroji Yoshida, Okazaki (JP); Toichi Ogura, Tokai (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 10/018,732

(22) PCT Filed: Jun. 19, 2000

(86) PCT No.: PCT/JP00/04000

§ 371 (c)(1), (2), (4) Date: Mar. 8, 2002

(87) PCT Pub. No.: WO00/78839

PCT Pub. Date: Dec. 28, 2000

(30) Foreign Application Priority Data

| Jun. 18, 1999 | (JP) | 11-172414 |
| Jul. 21, 1999 | (JP) | 11-205836 |
| Jul. 21, 1999 | (JP) | 11-205838 |
| Jul. 26, 1999 | (JP) | 11-210370 |
| Jul. 30, 1999 | (JP) | 11-216585 |
| Sep. 14, 1999 | (JP) | 11-259914 |
| Sep. 20, 1999 | (JP) | 11-264727 |
| Sep. 27, 1999 | (JP) | 11-273086 |
| Jan. 6, 2000 | (JP) | 2000-000609 |

(51) Int. Cl.
*D04G 3/00* (2006.01)
(52) U.S. Cl. ............ 428/364; 428/365; 264/172.17
(58) Field of Classification Search ............ 428/364, 428/365; 264/172.17
See application file for complete search history.

(56) References Cited

U.S. PATENT DOCUMENTS

| 5,360,892 A | 11/1994 | Bonsignore et al. |
| 5,574,129 A | 11/1996 | Miyoshi et al. |
| 5,807,973 A | 9/1998 | Gruber et al. |
| 6,114,495 A * | 9/2000 | Kolstad et al. ......... 528/354 |
| 6,174,602 B1 * | 1/2001 | Matsui et al. ......... 428/373 |

FOREIGN PATENT DOCUMENTS

| EP | 0 990 678 A2 | 4/2000 |
| JP | 07304859 | 11/1995 |
| JP | 08143649 | 6/1996 |
| JP | 8-231688 | 9/1996 |
| JP | 9-316310 | 12/1997 |
| JP | 10-287735 | 10/1998 |
| JP | 11-43857 | 2/1999 |
| WO | 93/15127 | 8/1993 |
| WO | 93/25202 | 12/1993 |
| WO | 95/09879 | 4/1995 |
| WO | 98/50611 | 11/1998 |

OTHER PUBLICATIONS

Adanur, Sabit. Wellington Sears Handbook of Industrial Textiles. Technomic Publishing Co., Inc. Lancaster, PA. 1995, pp. 57-60.*
JP 10287735 A English Tanslation.*
JP 10287735 A English Translation, published Oct. 27, 1998.*
Khaled Mezghani et al., *J. Polymer Sci.: Part B: Polymer Physics*, vol. 36, 1005-1012, 1998.
David R. Witzke et al., *Macromolecules*, vol. 30, 7075-7085, 1997.
European Search Report, Jul. 27, 2004.

* cited by examiner

*Primary Examiner*—Norca Torres-Velazquez
(74) *Attorney, Agent, or Firm*—Morgan & Finnegan, LLP

(57) ABSTRACT

A polylactic acid resin suitable for use especially in textile products; textile products obtained from the resin as a raw material (a fiber, multifilament, monofilament, staple, false-twist yarn, long-fiber nonwoven fabric, etc.); and processes for producing these textile products. The polylactic acid resin is a resin consisting mainly of a polylactic acid and is characterized in that it is linear, has an L-isomer content of 95 mol % or higher, an Sn content of 30 ppm or lower, a monomer content of 0.50 wt. % or lower, and has a relative viscosity of 2.7 to 3.9 or has a weight-average molecular weight of 120,000 to 220,000 and a number-average molecular weight of 60,000 to 110,000. Each of the textile products comprises the polylactic acid resin as the main material. The textile products each comprises a polylactic acid that is excellent in processability and excellent fiber properties. The free textile products are problems in practical use.

6 Claims, 2 Drawing Sheets

POLYLACTIC ACID RESIN, TEXTILE PRODUCTS OBTAINED THEREFROM, AND PROCESSES FOR PRODUCING TEXTILE PRODUCTS

FIELD OF THE INVENTION

The present invention relates to a resin mainly comprising polylactic acid and textile products using the resin as a starting material, and processes for producing the textile products.

BACKGROUND ART

The most widely used textile materials today include synthetic resins such as polyesters represented by polyethylene terephthalate and polyamides represented by 6-nylon and 66-nylon.

While these synthetic resins are advantageous in their capability of cheap mass production, they involve some problems related to their disposal. The textile made of such synthetic resins can be hardly decomposed in the natural environment, and high heat of combustion is generated by incineration.

Under these situations, use of biodegradable synthetic resins such as polycaprolactone and polylactic acid for textiles have been proposed. Although these resins are excellent in biodegradability, they are still not suitable for practical applications as compared with non-degradable synthetic resins such as polyethylene terephthalate and nylon that have been widely used.

These problems are poor process throughput during the producing process (spinning, drawing, false twisting and the like), inferior properties such as tensile strength and elongation percentage of the textile products obtained as compared with conventional synthetic fibers.

The inventors of the present invention have made intensive survey on the physical and chemical properties of polylactic acid, and have investigated polylactic acid resins particularly suitable for use in the textile products. We have also found polylactic acid textile products being excellent in productivity and having favorable properties by using polylactic acid having selected properties, and a process for producing the textile products. The object of the present invention is to provide practically acceptable textile products comprising polylactic acid having excellent properties for use in textiles with high productivity.

DISCLOSURE OF THE INVENTION

The object as hitherto described is attained by a polylactic acid resin mainly comprising linear polylactic acid comprising 95 mol % or more of the L-isomer and containing 0 or 30 ppm or less of tin(Sn) and 0 or 0.5% by weight or less of monomer content with a relative viscosity ηrel of 2.7 to 3.9, and a polylactic acid resin mainly comprising linear polylactic acid comprising 95 mol % or more of the L-isomer and containing 0 or 30 ppm or less of Sn and 0 or 0.5% by weight or less of monomer content with a weight average molecular weight Mw of 120,000 to 220,000 and number average molecular weight Mn of 60,000 to 110,000. The present invention also provides a textile product mainly using the polylactic acid resin as a starting material.

DESCRIPTION OF THE PREFERRED (Polylactic Acid Resin)

The polylactic acid resin according to the present invention, fiber thereof, and the process for producing them will be described first.

The polylactic acid resin according to the present invention include (1) a polylactic acid resin mainly comprising linear polylactic acid comprising 95 mol % or more of the L-isomer and containing 0 or 30 ppm or less of Sn and 0 or 0.5% by weight or less of monomer content with a relative viscosity ηrel of 2.7 to 3.9, and (2) a polylactic acid resin mainly comprising linear polylactic acid comprising 95 mol % or more of the L-isomer and containing 0 or 30 ppm or less of Sn and 0 or 0.5% by weight or less of monomer content with a weight average molecular weight Mw of 120,000 to 220,000 and number average molecular weight Mn of 60,000 to 110,000. The polylactic acid fiber according to the present invention and the producing process thereof comprise the following elements:

(3) a polylactic acid fiber comprising the polylactic acid resin in (1) or (2) above; and (4) a process for producing the polylactic acid fiber by melt-spinning using polylactic acid in (1) or (2).

Polylactic acid to be used in the present invention has a linear structure, or substantially has no branched structure. A small amount of branching agent has been added during polymerization of polylactic acid in order to improve melt viscosity and degree of polymerization in the former proposal. However, it was confirmed by the inventors of the present invention that the branched structure of the starting resin material for producing the polylactic acid fiber has a far more negative effect on spinning work efficiency as compared with production of conventional polyester fibers. In other words, even a small amount of the branched structure adversely affect spinning work efficiency of polylactic acid, besides the fiber obtained has a low tensile strength.

For excluding the branched structure, it is recommended that chemicals that causes branched structures in the polymer material, for example three valent or four valent alcohols and carboxylic acids, are not used at all. When these chemicals are forced to use for some other reasons, the amount of use should be restricted within a range as small as possible so that spinning work efficiency is not adversely affected.

Although polylactic acid used in the present invention is derived from a starting material such as L-lactic acid or D-lactic acid, or L-lactide or D-lactide as a dimer of lactic acid, or mesolactide, it is essential that the proportion of the L-isomer is 95 mol % or more. This is because increased proportion of the D-isomer makes the polymer amorphous and crystal orientation is not advanced in the spinning and drawing process, thereby deteriorating the properties of the fiber obtained. In particular, the tensile strength remarkably decreases with excess contraction ratio in boiling water to make the fiber to be practically inapplicable.

Polylactic acid to be used in the present invention is required to contain 0 or 30 ppm or less, preferably 0 or 20 ppm or less, of Sn content in the polymer. While the Sn content based catalyst is used as a polymerization catalyst of polylactic acid, a content of more than 30 ppm causes depolymerization during the spinning process to allow the filtration pressure at the nozzle to increase in a short period of time, thereby remarkably decreasing spinning work efficiency.

For decreasing the Sn content, the amount of use for polymerization may be decreased, or chips may be washed with an appropriate solvent.

The polylactic acid to be used in the present invention contains 0.5% by weight, preferably 0.3% by weight or less and particularly 0 or 0.2% by weight or less, of monomers. The monomer as defined in the present invention is referred to the component having a molecular weight of 1,000 or less as calculated from a GPC assay. A content of the monomer of more than 0.5% by weight causes remarkable decrease of work efficiency, because heat resistance of polylactic acid decreases due to heat decomposition of the monomer component.

For reducing the monomer content in polylactic acid, unreacted monomers are removed by evacuation of the reaction vessel immediately before completing the polymerization reaction, polymerized chips are washed with an appropriate solvent, or polylactic acid is produced by a solid phase polymerization.

Polylactic acid to be used in the present invention preferably has a weight average molecular weight Mw of 120,000 to 220,000 and number average molecular weight Mn of 60,000 to 110,000. While the molecular weight in this range afford excellent spinning ability and sufficient tensile strength, the molecular weight out of this range causes large decrease of the molecular weight during sinning to fail in obtaining a sufficient tensile strength.

Polylactic acid to be used in the present invention has a relative viscosity ηrel of 2.7 to 3.9. The relative viscosity of lower than this range causes to reduce heat resistance of the polymer and to fail in obtaining a sufficient strength, while the relative viscosity of higher than this range requires an elevated spinning temperature to cause heat-degradation during the spinning process.

The relative viscosity having a lower reduction ratio during the spinning process is favorable and the preferable reduction ratio of relative viscosity is 7% or less for spinning multifilaments. A reduction ratio of 7% or less substantially results in no decomposition of the polymer during spinning, give rise to good spinning ability without arising broken fibers during spinning, and enabling particularly high tensile strength in the drawing process.

It is preferable for practical production that the fiber produced has a tensile strength of 3.5 cN/dtex or more.

Examples of the polylactic acid fiber according to the present invention include multifilament, staple fiber, spunbond, monofilament and flat yarn.

The fiber according to the present invention can be obtained by melt-spinning process known in the art.

A biodegradable fiber excellent in work efficiency and properties of the textile may be obtained by producing the polylactic acid fiber using the resin according to the present invention. According to the process of the present invention, the polylactic acid fiber having physical properties such as tensile strength, drawing ratio and contraction ratio in boiling water comparable to conventional polyester and nylon fibers can be obtained, wherein the fiber is excellent in heat resistance without decreasing spinning ability, the spinning nozzle has a sufficiently long service life, and the fibers are free from breakage and fluffs.

The present invention will be described in more detail with reference to examples. Analysis of the properties of the polymer will be described first.

(Molecular Weight/Monomer Content)

Samples were dissolved in chloroform in a concentration of 10 mg/mL, and Mw and Mn were measured by the GPC assay using Waters LC Model I Plus equipped with a RI detector. Polystyrene was used as a standard substance of the molecular weight.

The proportions of the monomer in the polymer was calculated from the proportion of the component having a molecular weight of 1,000 or less.

(Relative Viscosity)

The samples were dissolved in a mixed solvent of phenol/tetrachloroethane=60/40 (in weight ratio) in a concentration of 1 g/dL, and the relative viscosity was measured at 20° C. using a Ubberohde viscosity tube.

(Sn Content)

The sample (0.5 g) was ashing by a wet process using sulfuric acid/nitric acid. The ashing sample was diluted with water to give a 50 mL sample solution, and the Sn content was measured using an ICP emission spectrometer SRS 1500VR made by Seiko Instruments Inc.

(Heat Stability)

The temperature at a mass reduction of the polymer of 5% was measured as TG (5%) using Seiko Instruments Inc TG/DTA 220U.

Spinning work efficiency and fiber properties were measured and evaluated as follows.

(Evaluation of Spinning Ability—1)

A 7-days' continuous spinning was performed by melt spinning. Incidence of broken fibers were evaluated in three steps (A, B and C) below:
  A: zero time of broken fiber in 7 days;
  B: one to two times of broken fiber in 7 days; and
  C: three or more times of broken fiber in 7 days.

(Evaluation of Spinning Ability—2)

Service life of the spinning nozzle was evaluated in terms of days when the spinning nozzle was forced to change by increment of filtration pressure during the 7-days' continuous spinning.

(Evaluation of Spinning Ability—3)

Incidence of broken fibers in the drawing process was evaluated in three steps of A, B and C:
  A: zero time of broken fiber in 7 days;
  B: one to two times of broken fiber in 7 days; and
  C: three or more times of broken fiber in 7 days.

(Measurements of Tensile Strength and Elongation Percentage)

Using a tensile strength tester manufactured by Shimadzu Co., a tensile test was performed at a speed of 20 cm/min using a sample with a length of 20 cm, and the tensile strength and elongation percentage was measured from the ultimate strength and ultimate elongation percentage, respectively.

(Contraction Ratio in Boiling Water)

A 200 mg weight was hanged to a sample with an initial length of 50 cm, and the sample was immersed in boiling water for 15 minutes followed by drying in the air for 5 minutes. The contraction ratio in boiling water was determined by the following equation:

Contraction ratio (%)=(initial sample length−sample length after contraction)/initial sample length× 100

(Fluffs)

Incidence of fluffs after reeling the drawn fiber was evaluated by the following two steps (o and x).
  o: no incidence of fluffs; and
  x: incidence of fluffs.

(Productivity of Filament)

Total evaluations of the filament was made in three steps of A, B and C by considering the evaluation of spinning ability 1, 2 and 3, and incidence of fluffs:
  A: very good
  B: good
  C: poor (Rate of Decrease of Viscosity During Spinning)

The relative viscosity (ηrel) of the filament extruded out of the spinning nozzle was measured, and the rate of decrease of viscosity during spinning was determined from the following equation. The residence time of the molten polymer in this example was about 10 minutes.

The rate of decrease of viscosity during spinning (%)= [(relative viscosity of the polymer−relative viscosity of the filament)/relative viscosity of the polymer]×100

(Polymerization of the Polymer)

L-lactide or D-lactide as a starting material was polymerized to polylactic acid using tin octylate as a polymerization catalyst by conventional polymerizing step. Polymerization was also carried out by adding 0.1 mol % of trimellitic acid as a cross-link agent (Comparative Example 10). While the polymer obtained was subsequently subjected to solid state polymerization at 135° C. to reduce the amount of the residual monomers, the solid state polymerization was omitted in a part of the samples for comparison.

(Spinning)

Filaments of 84 dtex/24f were obtained by a conventional filament process of spinning and drawing by extruding the molten resin in the air through a spinning nozzle with a spinning hole diameter of 0.25 mm and number of spinning holes of 24. The spinning test was continued for 7 days to evaluate spinning ability, service life of the nozzle and incidence of fluffs during drawing.

EXAMPLES 1-1 TO 1-2, AND COMPARATIVE EXAMPLES 1-1 TO 1-5

Table 1-1 shows the changes of spinning ability, service life of the nozzle and incidence of fluffs during drawing when the content of Sn in the polymer is changed, and the results of the quality of the fiber.

In Comparative Examples 1-1 to 1-3, the polymer had been depolymerized during spinning due to particularly large content of Sn (the amount of the residual catalyst). Consequently, the viscosity was largely decreased during the spinning step to make it very difficult to spin. In addition, the service life of the nozzle was a short as one day, quite large number of fluffs had generated during the spinning step due to large rate of decrease of viscosity during the drawing step, and the fiber obtained had a quite poor tensile strength of 2.6 cN/dtex or less to make it impossible to use the fiber for practical purposes.

While the rate of decrease of viscosity during spinning was improved to 17.6% in Comparative Example 1-4, the service life of the nozzle was as short as three days. Although incidence of fluffs during drawing was also improved, the fiber was inappropriate for practical uses since a practical tensile strength of the fiber of 3.5 cN/dtex was not attained.

The service life of the nozzle was increased to six days and the tensile strength of the fiber satisfied the practical level of 3.5 cN/dtex or more in Comparative Example 1-5, since the rate of decrease of viscosity during spinning was improved to 12.3%. However, improvement of incidence of fluffs was yet insufficient because the resin contained as much Sn content as 35 ppm.

In Examples 1-1 and 1-2, the rate of decrease of viscosity was as small as 5.0%, and spinning ability, service life of the nozzle and incidence of fluffs during drawing were very excellent, since the content of Sn in the resin was 50 ppm or less. The tensile strength of the filament obtained was also excellent showing a level of 4.0 cN/dtex or more. Particularly, since the rate of decrease of viscosity during spinning was 7% or less, the degree of polymer degradation during the spinning process was small with no incidence of break of fibers during the spinning process, enabling good spinning ability to be obtained as a result of high tensile strength during the drawing process.

While the rate of decrease of viscosity during spinning was improved to 17.6% in Comparative Example 1-4, the service life of the nozzle was as short as three days. Although incidence of fluffs during drawing was also improved, the fiber was inappropriate for practical uses since a practical tensile strength of the fiber of 3.5 cN/dtex was not attained.

The service life of the nozzle was increased to six days and the tensile strength of the fiber satisfied the practical level of 3.5 cN/dtex or more in Comparative Example 1-5, since the rate of decrease of viscosity during spinning was improved to 12.3%. However, improvement of incidence of fluffs was yet insufficient because the resin contained as much Sn content as 35 ppm.

In Examples 1-1 and 1-2, the rate of decrease of viscosity was as small as 5.0%, and spinning ability, service life of the nozzle and incidence of fluffs during drawing were very excellent, since the content of Sn in the resin was 50 ppm or less. The tensile strength of the filament obtained was also excellent showing a level of 4.0 cN/dtex or more. Particularly, since the rate of decrease of viscosity during spinning was 7% or less, the degree of polymer degradation during the spinning process was small with no incidence of break of fibers during the spinning process, enabling good spinning ability to be obtained as a result of high tensile strength during the drawing process.

TABLE 1-1

| No.1- | Comparative Example | | | | | Example | |
|---|---|---|---|---|---|---|---|
| | 1 | 2 | 3 | 4 | 5 | 1 | 2 |
| Sn Content (ppm) | 824 | 412 | 82 | 62 | 35 | 26 | 17 |
| Relative Viscosity of Polymer (ηrel) | 2.96 | 2.95 | 2.97 | 2.94 | 3.00 | 2.93 | 2.98 |
| Monomer Content (% by weight) | 0.26 | 0.23 | 0.25 | 0.24 | 0.26 | 0.26 | 0.25 |
| Branched Structure | Non | Non | Non | Non | Non | Non | Non |
| L-isomer (mol %) | 96.4 | 97.0 | 96.6 | 95.5 | 97.1 | 97.8 | 96.4 |
| Spinning Temperature (° C.) | 230 | 230 | 230 | 230 | 230 | 230 | 230 |
| Rate of Decrease of Viscosity during Spinning (%) | 73.6 | 64.3 | 52.3 | 17.6 | 12.3 | 5.0 | 3.6 |
| Spinning Ability 1 | C | C | C | C~B | B | A | A |
| Spinning Ability 2 | 1 | 1 | 1 | 3 | 6 | ≧7 | ≧7 |
| Spinning Ability 3 | C | C | C | C~B | B | A | A |

TABLE 1-1-continued

|  | Comparative Example | | | | | Example | |
| --- | --- | --- | --- | --- | --- | --- | --- |
| No.1- | 1 | 2 | 3 | 4 | 5 | 1 | 2 |
| Fluffs | × | × | × |  | ×~○ | ○ | ○ |
| Productivity of Filament | C | C | C | C~B | B | A | A |
| Tensile Strength (cN/dtex) | 1.78 | 1.87 | 2.23 | 3.14 | 3.76 | 4.38 | 4.53 |
| Elongation (%) | 26.3 | 27.3 | 28.3 | 28.6 | 30.3 | 29.3 | 28.6 |
| Contraction Ratio in Boiling Water (%) | 13.4 | 15.6 | 14.6 | 15.3 | 11.6 | 11.2 | 10.5 |

EXAMPLES 1-3 TO 1-5, AND COMPARATIVE EXAMPLES 1-6 TO 1-9

Tables 1-2 and 1-3 show the changes of spinning ability, service life nozzle and incidence of fluffs during drawing when the monomer content in the polymer is changed and the results of the quality of the fiber.

In Comparative Examples 1-6 to 1-8, the resin was heat-decomposed during spinning due to particularly large content of the monomer in the polymer. Spinning was quite difficult due to large decrease of the viscosity of the polymer during spinning, the service life of the nozzle was only one day, and a large quantity of fluffs was generated in the drawing process. The filament obtained had a poor fiber quality with a tensile strength of less than 3.5 cN/dtex to make the filament to be practically inapplicable.

The monomer content was also large in Comparative Example 1-9, and the resin was inadequate for practical use since the service life of the nozzle was as short as five days.

The rate of decrease of viscosity during spinning was improved to 5% or less in Examples 1-3 to 1-5, since heat decomposition could be suppressed by reducing the monomer content to 0.5% by weight or less. Spinning ability, service life of the nozzle and incidence of fluffs during drawing were also favorable in addition to high tensile strength of the filament obtained of 4.0 cN/dtex or more.

TABLE 1-2

| No. 1- | Comparative Example | | | |
| --- | --- | --- | --- | --- |
| Monomer Content (% by weight) | 10.2 | 5.76 | 3.46 | 0.98 |
| Relative Viscosity of Polymer (ηrel) | 2.96 | 2.89 | 2.92 | 3.02 |
| Branched Structure | Non | Non | Non | Non |
| Sn Content (ppm) | 18 | 19 | 18 | 17 |
| L-isomer (mol %) | 95.4 | 96.0 | 95.6 | 96.5 |
| Spinning Temperature (° C.) | 230 | 230 | 230 | 230 |
| Rate of Decrease of Viscosity during Spinning (%) | 25 | 20 | 15 | 10 |
| Spinning Ability 1 | C | C | C | B |
| Spinning Ability 2 | 1 | 1 | 2 | 5 |
| Spinning Ability 3 | C | C | C | B |
| Fluffs | × | × | × | ×~○ |
| Productivity of Filament | C | C | C | C~B |
| Tensile Strength (cN/dtex) | 2.67 | 2.75 | 3.29 | 3.25 |
| Elongation (%) | 26.8 | 26.4 | 27.9 | 28.9 |
| Contraction Ratio in Boiling Water (%) | 12.4 | 14.6 | 13.2 | 12.3 |

TABLE 1-3

| | Example | | |
| --- | --- | --- | --- |
| No. 1- | 3 | 4 | 5 |
| Monomer Content (% by weight) | 0.47 | 0.26 | 0.15 |
| Relative Viscosity of Polymer (ηrel) | 2.96 | 2.98 | 3.02 |
| Branched Structure | Non | Non | Non |
| Sn Content (ppm) | 19 | 21 | 16 |
| L-isomer (mol %) | 96.8 | 98.4 | 98.4 |
| Spinning Temperature (° C.) | 230 | 230 | 230 |
| Rate of Decrease of Viscosity during Spinning (%) | 5 | 2 | 1.5 |
| Spinning Ability 1 | A | A | A |
| Spinning Ability 2 | ≧7 | ≧7 | ≧7 |
| Spinning Ability 3 | A | A | A |
| Fluffs | ○ | ○ | ○ |
| Productivity of Filament | A | A | A |
| Tensile Strength (cN/dtex) | 4.33 | 4.58 | 4.68 |
| Elongation (%) | 30.3 | 29.6 | 30.6 |
| Contraction Ratio in Boiling Water (%) | 10.2 | 10.9 | 9.8 |

EXAMPLES 1-6 TO 1-7, AND COMPARATIVE EXAMPLES 1-10 TO 1-14

Tables 1-4 and 1-5 show the result of spinning with respect to changes of the proportion of L-isomer, presence/absence of the branched structure, and the molecular weight of the polymer and relative viscosity.

Although the polymer in Example 1-6 has similar properties to the polymer in Comparative Example 1-10 except the presence or absence of the branched structure, the polymer in Comparative Example 1-10 having the branched structure has somewhat poor spinning ability while generating fluffs during drawing, and the tensile strength of the fiber obtained in the comparative example is lower than 3.5 cN/dtex as compared with that of the fiber without any branches. Accordingly, the fiber in Comparative Example 1-10 was practically inapplicable.

Crystal orientation is not advanced during spinning and drawing in the fiber in Comparative Example 1-14 (Table 1-5) containing less than 95 mol % or less of the L-isomer due to the decreased content of the L-isomer. The tensile strength thereof was less than 3.5 cN/dtex with a contraction ratio in boiling water of 30% or more. Therefore, the filament was practically inapplicable due to poor dimensional stability in usual wove and knit processing.

The polymer in Comparative Example 1-11 had so low molecular weight and relative viscosity that spinning and drawing ability become poor with a low tensile strength of less than 3.5 cN/dtex. In contrast, the polymers in Comparative Examples 1-12 and 1-13 had so high molecular weight and relative viscosity that an elevated spinning temperature was required. However, the rate of decrease of viscosity during spinning was increased to 15% by increasing the spinning temperature to deteriorate spinning and drawing ability with incidence of fluffs during drawing, thereby making the fiber practically inapplicable.

TABLE 1-4

| No. 1- | Example | |
|---|---|---|
| Branched Structure | Non | Non |
| L-isomer (mol %) | 98.7 | 96.0 |
| Relative Viscosity of Polymer (ηrel) | 3.02 | 3.68 |
| Molecular weight (Mw) | $14.6 \times 10$ | $19.5 \times 10$ |
| Molecular weight (Mn) | $7.2 \times 10$ | $9.4 \times 10$ |
| Sn Content (ppm) | 18 | 17 |
| Monomer Content (% by weight) | 0.27 | 0.27 |
| Spinning Temperature (° C.) | 230 | 230 |
| Rate of Decrease of Viscosity during Spinning (%) | 3 | 4 |
| Spinning Ability 1 | A | A |
| Spinning Ability 2 | ≧7 | ≧7 |
| Spinning Ability 3 | A | A |
| Fluffs | ○ | ○ |
| Productivity of Filament | A | A |
| Tensile Strength (cN/dtex) | 4.43 | 4.38 |
| Elongation (%) | 30.3 | 30.8 |
| Contraction Ratio in Boiling Water (%) | 9.8 | 14.8 | birefringence (Δn) of 0.025 or more and peak temperature of thermal stress of 85° C. or more; and (8) a multifilament according to the feature (5) having an inert content of 3.0% or less and contraction ratio in boiling water of 12% or less. Inert as used herein means fibers having irregular linear density.

The process for producing the multifilament according to the present invention comprises the following two features:

(9) a process for producing the polylactic acid multifilament using the polylactic acid according to the features (5) or (6) comprising the steps of spinning at a speed of 3,000 m/min or more to 4,500 m/min or less, drawing at a draw magnification factor of 1.3 or more at a draw temperature of 100 to 125° C., and heat-setting at 125 to 150° C.; and

(10) a process for producing the polylactic acid multifilament using the polylactic acid according to the features (5) comprising the steps of drawing between the roller heaters (1) and (2), and heat-setting at the roller heater (2).

In the conventional method, the polylactic acid biodegradable fiber is manufactured by spinning at a low speed of 3,000 m/min or less followed by drawing. Although Japanese Patent Application Laid-open No. 7-216646 and 7-133569 disclose, for example, a producing method in which a non-drawn poly-

TABLE 1-5

| | Comparative Example | | | | |
|---|---|---|---|---|---|
| No. 1- | 10 | 11 | 12 | 13 | 14 |
| Branched Structure | Yes | Non | Non | Yes | Non |
| L-isomer (mol %) | 99.0 | 96.4 | 97.0 | 98.7 | 92.6 |
| Relative Viscosity of Polymer (ηrel) | 3.04 | 2.58 | 4.02 | 4.03 | 3.02 |
| Molecular weight (Mw) | $14.8 \times 10^4$ | $10.2 \times 10^4$ | $23.8 \times 10^4$ | $24.0 \times 10^4$ | $14.5 \times 10^4$ |
| Molecular weight (Mn) | $7.6 \times 10^4$ | $5.4 \times 10^4$ | $12.1 \times 10^4$ | $12.4 \times 10^4$ | $7.1 \times 10^4$ |
| Sn Content (ppm) | 19 | 18 | 20 | 18 | 21 |
| Monomer Content (% by weight) | 0.26 | 0.26 | 0.25 | 0.24 | 0.27 |
| Spinning Temperature (° C.) | 230 | 230 | 245 | 245 | 230 |
| Rate of Decrease of Viscosity during Spinning (%) | 6 | 8 | 15 | 20 | 3 |
| Spinning Ability 1 | B | B | C | C | A |
| Spinning Ability 2 | 4 | 4 | 5 | 3 | ≧7 |
| Spinning Ability 3 | B | C | C | C | B |
| Fluffs | × | × | × | × | × |
| Productivity of Filament | C | B | C | C | B |
| Tensile Strength (cN/dtex) | 3.51 | 3.37 | 3.55 | 3.41 | 2.67 |
| Elongation (%) | 29.6 | 28.7 | 30.2 | 29.8 | 30.3 |
| Contraction Ratio in Boiling Water (%) | 10.2 | 10.1 | 9.7 | 10.2 | 30.5 |

(Multifilament)

The multifilament according to the present invention will be described hereinafter.

The multifilament according to the present invention can comprises the one constitution element of the following two constitution elements of the invention:

(5) a multifilament comprising a linear polylactic acid containing 98 mol % or more of the L-isomer, 0 or 30 ppm or less of Sn content and 0 or 0.5% by weight or less of monomers with a relative viscosity of 2.7 to 3.9; and (6) a multifilament comprising a linear polylactic acid containing 98 mol % or more of the L-isomer, 0 or 30 ppm or less of Sn and 0 or 0.5% by weight or less of monomers with Mw of 120,000 to 220,000 and Mn of 60,000 to 110,000.

The preferable embodiments of (5) and (6), comprise the following features:

(7) a multifilament having a tensile strength of 3.9 cN/dtex or more, contraction ratio in boiling water of 12% or less, lactic acid fiber spun at a speed of 1000 m/min or less is reeled and an orientation fiber is obtained in the drawing step, copolymerization of polyethylene glycol is necessary in the process disclosed above.

However, work efficiency of the producing process can be hardly improved by the processes described above, and it was impossible to obtain physical and chemical properties and work efficiency comparable to the fibers made of conventional (non-biodegradable) synthetic resins.

The inventors of the present invention have strictly surveyed the chemical and physical properties of polylactic acid as a starting material of the fiber, and have succeeded in providing a polylactic acid multifilament having such properties as tensile strength, elongation percentage and contraction ratio in boiling water comparable to polyester and nylon fibers, as well as being compatible to post-processing such as weaving, knitting and dyeing as in the polyester and nylon fibers, by using polylactic acid having selected properties and by investigating the spinning and drawing steps.

Polylactic acid to be used in the present invention has a linear structure, or substantially has no branched structure. It has been proposed in the former proposal to add a small amount of branching agent in polymerization of polylactic acid in order to improve melt viscosity and degree of polymerization. However, it was confirmed by the inventors of the present invention that the branched structure of the resin material far more negatively affects work efficiency of spinning as compared with conventional polyester fibers in producing the polylactic acid fiber. Polylactic acid containing even a small amount of the branched structure exhibits lower tensile strength than polylactic acid containing no branched structure.

For excluding the branched structure, it is recommended not to use any agents such as trivalent or quadrivalent alcohol and carboxylic acids that arises the branched structure in the polymer material. When the components having such structure as described above are forced to use for some reasons, the amount of use should be restricted within a minimum essential quantity that does not affect work efficiency of spinning such as break of fibers.

While polylactic acid to be used in the present invention comprises L-lactic acid or D-lactic acid, or L-lactide or D-lactide as a dimer of lactic acid, it is crucial that lactic acid comprises 98 mol % or more of the L-isomer. This is because the polymer becomes amorphous when the proportion of the D-isomer increases and crystal orientation is inhibited in the spinning and drawing steps, thereby making the properties of the fiber obtained poor. In particular, the tensile strength is extremely degraded while excessively increasing the contraction ratio in boiling water to make practical application of the fiber impossible.

Polylactic acid to be used in the present invention contains 0 or 30 ppm or less, preferably 0 or 20 ppm or less, of Sn. While Sn base catalyst used as a polymerization catalyst of polylactic acid, a residual amount of Sn of over 30 ppm causes depolymerization during spinning to bring about rapid increase of the nozzle pressure and extremely decreased work efficiency of spinning.

In order to reduce the content of Sn, the amount of Sn used for polymerization is reduced to be as small as possible, or the chip is washed with an appropriate solvent.

The monomer content in the polylactic acid to be used in the present invention is 0.5% by weight or less, preferably 0.3% by weight or less and in particular 0 or 0.2% by weight or less. The monomer as defined in the present invention refers to the component with a molecular weight of 1,000 or less as measured by the GPC analysis. Work efficiency of the fiber decreases due to occurrence of break of fibers in the spinning and drawing steps, when the monomer content exceeds 0.5% by weight. This is because the monomer component is decomposed by heat to decrease heat resistance of polylactic acid.

Unreacted monomers may be removed by evacuating the reaction vessel just before completing the polymerization reaction, polymerized chips may be washed with an appropriate liquid, or polylactic acid is synthesized by solid phase polymerization in order to reduce the content of monomers in polylactic acid.

Polylactic acid to be used in the present invention preferably has a weight average molecular weight Mw of 120,000 to 220,000, more preferably 130,000 to 160,000. Polylactic acid to be used in the present invention preferably also has a number average molecular weight Mn of 60,000 to 110,000, more preferably 70,000 to 90,000. While a molecular weight in this range allows an excellent spinning ability and sufficient tensile strength to be obtained, a sufficiently high tensile strength cannot be obtained at a molecular weight as low as out of this range because large decrease of the molecular weight.

Polylactic acid to be used in the present invention has a relative viscosity of 2.7 to 3.9. A relative viscosity lower than this range makes heat resistance of the polymer poor, while a relative viscosity higher than this range requires the spinning temperature to be increased to cause heat degradation during spinning. The preferable relative viscosity is in the range of 2.9 to 3.3.

The lower the reduction ratio of the relative viscosity of the multifilament during spinning is preferable, and the reduction ratio is, for example, preferably 0 or 7% or less relative to the polymer. The reduction ratio of 0 or 7% or less substantially causes no decomposition of the polymer during spinning, makes spinning ability good without arising break of fibers during spinning, and allows the tensile strength in the drawing step to be particularly high.

The multifilament according to the present invention preferably has a tensile strength of 4.0 cN/dtex or more, because no break of fibers occurs during each processing step. A birefringence of 0.030 or more is required for increasing the tensile strength to 4.0 cN/dtex or more.

The peak temperature of thermal stress of the multifilament is preferably 85° C. or more, more preferably 90° C. or more, in order to prevent dyeing from being fatigued when the multifilament is dyed under an atmospheric pressure. A peak temperature of thermal stress of 85° C. or more is preferable since the degree of fatigue of the dye is reduced.

The multifilament preferably has an inert content of 3% or less in the multifilament according to the present invention comprising linear polylactic acid containing 98 mol % or more of the L-isomer, 0 or 30 ppm or less of Sn and 0 or 0.5% by weight or less of monomers with a relative viscosity of 2.7 to 3.9. An inert content of 3% or less is preferable since uneven dyeing seldom occurs. The more preferable inert content is 1% or less.

The present invention related to the process for producing the multifilament will be described hereinafter. In the present invention, the multifilament is spun at a spinning speed of 3,000 m/min or more and 5,000 m/min or less, drawn at a draw magnification ratio of 1.3 or more at a draw temperature of 100 to 125° C., and subjected to heat-setting at 125 to 150° C.

Crystal orientation becomes insufficient at a spinning speed of less than 3,000 m/min to make work efficiency of the filament very poor due to break of fibers at a draw temperature of 110° C. or more. A spinning speed of exceeding 4,500 m/min makes the filament uneven to generate uneven spots by cooling, thereby causing unstable work efficiency of spinning.

Crystal orientation is prevented from advancing at a draw temperature of less than 110° C. break of fibers and uneven spots by drawing causes. Too high draw temperature of exceeding 125° C. causes break of fibers during the draw step.

The tensile strength of the fiber becomes as low as less than 4.1 cN/dtex causing many troubles in the processing step such as break of fibers during weaving and knitting, unless the draw magnification factor exceeds 1.3. A draw magnification factor of 1.3 or more makes the fibers available for various processing by adjusting the elongation percentage. The draw magnification factor is preferably 1.3 to 1.8, more preferably 1.5 to 1.7, considering balance between the tensile strength and elongation percentage.

A too low heat-set temperature of lower than 125° C. makes the contraction ratio in boiling water high, and the fiber cannot be used due to large contraction in the post-processing. A heat-set temperature of exceeding 150° C. causes break of fibers since the temperature is close to the melting point of the polylactic acid fiber. Therefore, a setting temperature of 135 to 150° C. is preferable considering productivity of the filament.

The process for producing the polylactic acid multifilament according to the present invention will be described hereinafter.

In the process for producing the polylactic acid multifilament according to the present invention, the polylactic acid resin having a selected composition and property above mentioned is melt-spun, drawn between the roller heaters (1) and (2), and heat-set at the roller heated (2). The producing process is illustrated in FIG. 1.

The conventional process is illustrated in FIG. 2. In this process, the non-drawn fiber 10 is drawn between a roller heater (21) and cold roller (23), heat-set at a plate heater (22) and rolled up through the cold roller to obtain rolled drawn fiber 20.

The roller heater (1) is preferably heated at 100 to 125° C. for orientation and crystallization of the multifilament in the producing process according to the present invention.

The multifilament according to the present invention should be heat-set at the roller heater (2). Using the roller heater permits the draw point to be fixed at just under the roller heater (1), thereby enabling the linear density (tex) of the fine fibers from being uneven.

The irregular linear density (tex) of the fine fiber is preferably restricted within ±10%, more preferably within ±7% or less, relative to the diameter of the multifilament. This range allows irregular dyeing to be prevented with favorable dyeing.

The heat-set temperature of the roller heater (2) is preferably in the range of 125 to 150° C. considering the contraction ratio in boiling water of the fiber obtained. The temperature is preferably 135 to 150° C. considering productivity of the filament.

EXAMPLE

The embodiments of the present invention will be described with reference to examples.

The processes for measuring and evaluating each property will be described first. Measurements and evaluations other than described below were carried out in accordance with the processes as hitherto described.

(Birefringence)

The birefringence of the fiber was measured by a Berek compensator method using α-bromonaphthaline as an immersion solution.

(Thermal Stress)

A thermal stress measuring instrument TYPE KE-2S made by Kanebo Engineering Co. was used.

(Fatigue after Dyeing)

A cylindrical knit sample was prepared using the multifilament, and the sample was dyed under an atmospheric pressure using a disperse dye. Fatigue of the sample after dyeing was totally evaluated in three steps of A, B and C:

A: very good (not fatigue at all)
B: good
C: poor (fatigue is so large that the product is not applicable as commercial products)

(Inert—Fiber with Irregular Linear Density))

Irregularity in the diameter of the multifilament obtained by a measuring speed of 50 m/min and twist speed of 5,000 rpm was determined in percentage using USTER-TESTER 4 made by Zelbeger-Uster Co.

(Dyeing)

A test textile was woven using the filament after drawing, and the textile was dyed under an atmospheric pressure using a disperse dye. Dyeing of the textile was evaluated in two steps (and x) based on irregular dyeing, dimensional stability and pilling.

o: uniform dyeing
x: irregular dyeing (Polymerization of Polymer)

Polylactic acid was synthesized by a process known in the art using L-lactide or D-lactide as a starting material and tin octylate as a polymerization catalyst. Trimellitic acid in a concentration of 0.1 mol % as a cross-link agent was added for polymerization for comparison. The polymer obtained was further polymerized at 135° C. in the solid phase to reduce the amount of remaining monomers. However, no solid phase polymerization was applied for a part of the examples as comparative examples.

EXAMPLES 2-1 AND 2-2, AND COMPARATIVE EXAMPLES 2-1 TO 2-5

Table 2-1 shows the results of evaluations of spinning ability and (1), (2) and service life of the nozzle when the polymers with various contents of Sn are spun at a spinning speed of 3,800 m/min.

With respect to Comparative Examples 2-1 to 2-3, the polymer was depolymerized during spinning due to particularly high content of Sn (residual catalyst). In addition, the rate of decrease of viscosity during spinning was very high to make spinning quite difficult, and the service life of the nozzle was as short as 1 day. Therefore, the polymer in these comparative examples are not practically applicable.

While the rate of decrease of viscosity during spinning was improved to 17.6% in the polymer in Comparative Example 2-4, the service life of the nozzle was only three days due to large content of Sn, which makes the polymer practically inapplicable.

The service life of the nozzle was prolonged to six days since the rate of decrease of viscosity during spinning was improved to 12.3%. However, the service life of seven days or more could not be attained since the content of Sn was as high as 35 ppm. The polymers in Examples 2-1 and 2-2 was excellent in spinning ability because the rate of decrease of viscosity during spinning was as small as 5.0% due to the small content of Sn of 50 ppm or less with sufficient service life of the nozzle.

TABLE 2-1

| No.2- | Examples | | Comparative Examples | | | | |
|---|---|---|---|---|---|---|---|
| | 1 | 2 | 1 | 2 | 3 | 4 | 5 |
| Sn Content (ppm) | 26 | 17 | 824 | 412 | 82 | 62 | 35 |
| Relative Viscosity of Polymer ($\eta$rel) | 2.93 | 2.98 | 2.96 | 2.95 | 2.97 | 2.94 | 3.00 |
| Monomer Content (% by weight) | 0.26 | 0.25 | 0.26 | 0.23 | 0.25 | 0.24 | 0.26 |
| Mw | $12.5 \times 10^4$ | $13.9 \times 10^4$ | $13.9 \times 10^4$ | $13.9 \times 10^4$ | $13.7 \times 10^4$ | $13.5 \times 10^4$ | $14.4 \times 10^4$ |

TABLE 2-1-continued

|  | Examples | | Comparative Examples | | | | |
|---|---|---|---|---|---|---|---|
| No.2- | 1 | 2 | 1 | 2 | 3 | 4 | 5 |
| Mn | $6.6 \times 10^4$ | $6.9 \times 10^4$ | $6.8 \times 10^4$ | $6.7 \times 10^4$ | $6.9 \times 10^4$ | $6.6 \times 10^4$ | $7.0 \times 10^4$ |
| Branched Structure | Non | Non | Non | Non | Non | Non | Non |
| L-isomer (mol %) | 97.8 | 96.4 | 96.4 | 97.0 | 96.6 | 95.5 | 97.1 |
| Spinning Temperature (° C.) | 230 | 230 | 230 | 230 | 230 | 230 | 230 |
| Rate of Decrease of Viscosity during Spinning (%) | 5.0 | 3.6 | 73.6 | 64.3 | 52.3 | 17.6 | 12.3 |
| Spinning speed (m/min) | 3800 | 3800 | 3800 | 3800 | 3800 | 3800 | 3800 |
| Spinning Ability 1 | A | A | C | C | C | C-B | B |
| Spinning Ability 2 | ≧7 | ≧7 | 1 | 1 | 1 | 3 | 6 |

EXAMPLES 2-3 TO 2-5, AND COMPARATIVE EXAMPLES 2-6 TO 2-9

Table 2-2 shows the results of spinning ability and service life of the nozzle when the spinning speed was adjusted to 3,500 m/min by varying the content of the monomer in the polymer.

With respect to Comparative Examples 2-6 to 2-8, the polymer was heat-decomposed during spinning due to particularly high content of the monomer in the polymer. In addition, spinning was quite difficult due to large rate of decrease of viscosity during spinning besides the service life of the nozzle was as short as one day, making the polymer practically inapplicable.

In the Comparative Example 2-9, the monomer content is still so high besides the service life of the nozzle is only five days, thereby also making the polymer practically inapplicable.

With respect to Examples 2-3 to 2-5, heat decomposition was suppressed by reducing the monomer content to 0.5% by weight or less. Consequently, the rate of decrease of viscosity during spinning was improved to 5% or less, also making spinning ability, service life of the nozzle and occurrence of fluffs during drawing quite favorable.

monomers are adjusted to 30 ppm or less and 0.5% by weight, respectively.

While the polymers in Example 2-6 and Comparative Example 2-10 have similar properties with each other except presence/absence of the branched structure, the polymer having the branched structure in Comparative Example 2-10 has somewhat poor spinning ability while generating fluffs during spinning. The tensile strength of the fiber was less than 3.5 cN/dtex, which is smaller than that of the fiber having no branched structure, and the peak temperature of thermal stress was 85° C. or less, causing fatigue of dyeing to make the fiber practically inapplicable.

Crystal orientation is hardly advanced during spinning and drawing in the fiber of Comparative Example 2-14 in Table 2-4 having the proportion of the L-isomer of less than 95 mol %. The tensile strength thereof is as small as less than 3.5 cN/dtex with the contraction ratio in boiling water of 30% or more. Therefore, the fiber is practically inapplicable as the multifilament due to poor dimensional stability in usual weave and knit processing.

Since the fiber of Comparative Example 2-11 has a low molecular weight and relative viscosity, spinning and draw-

TABLE 2-2

|  | Example | | | Comparative Example | | | |
|---|---|---|---|---|---|---|---|
| No.2- | 3 | 4 | 5 | 6 | 7 | 8 | 9 |
| Monomer Content (% by weight) | 0.46 | 0.26 | 0.15 | 10.2 | 5.76 | 3.46 | 0.98 |
| Relative Viscosity of Polymer (ηrel) | 2.97 | 2.96 | 2.56 | 2.96 | 2.89 | 2.92 | 3.02 |
| Branched Structure | Non | Non | Non | Non | Non | Non | Non |
| Sn Content (ppm) | 19 | 21 | 16 | 18 | 19 | 18 | 17 |
| L-isomer (mol %) | 96.8 | 98.4 | 98.4 | 95.4 | 96.0 | 95.6 | 96.5 |
| Mw | $13.8 \times 10^4$ | $14.0 \times 10^4$ | $14.4 \times 10^4$ | $13.9 \times 10^4$ | $13.7 \times 10^4$ | $12.5 \times 10^4$ | $14.4 \times 10^4$ |
| Mn | $6.8 \times 10^4$ | $6.9 \times 10^4$ | $7.0 \times 10^4$ | $6.7 \times 10^4$ | $6.9 \times 10^4$ | $6.6 \times 10^4$ | $7.0 \times 10^4$ |
| Spinning Temperature (° C.) | 230 | 230 | 230 | 230 | 230 | 230 | 230 |
| Spinning speed (m/min) | 3500 | 3500 | 3500 | 3500 | 3500 | 3500 | 3500 |
| Rate of Decrease of Viscosity during Spinning (%) | 5 | 2 | 1.5 | 25 | 20 | 15 | 10 |
| Spinning Ability 1 | A | A | A | C | C | C | B |
| Spinning Ability 2 | ≧7 | ≧7 | ≧7 | 1 | 1 | 2 | 5 |

EXAMPLES 2-6 TO 2-7, AND COMPARATIVE EXAMPLES 2-10 TO 2-14

Tables 2-3 and 2-4 show productivity and properties of the multifilament by changing the proportion of the L-isomer, the molecular weight and relative viscosity of the polymer with or without the branched structure with the spinning speed and draw conditions constant, wherein the contents of Sn and ing ability becomes poor and the tensile strength thereof is as small as less than 3.5 cN/dtex. In Comparative Examples 2-12 and 2-13, on the other hand, the molecular weight and relative viscosity is so high that the spinning temperature is forced to be elevated. Increasing the spinning temperature results in the rate of decrease of viscosity during spinning to increase to 15% or more to make spinning and drawing ability poor with appearance of fluffs during drawing, thereby making the fiber to be practically inapplicable.

TABLE 2-3

| No. 2- | Examples | |
|---|---|---|
| | 6 | 7 |
| Monomer Content (% by weight) | 0.27 | 0.27 |
| Relative Viscosity of Polymer ($\eta$rel) | 3.02 | 3.68 |
| Branched Structure | Non | Non |
| Sn Content (ppm) | 18 | 17 |
| L-isomer (mol %) | 98.7 | 96.0 |
| Mw | $14.6 \times 10^4$ | $19.5 \times 10^4$ |
| Mn | $7.2 \times 10^4$ | $9.4 \times 10^4$ |
| Spinning Temperature (° C.) | 230 | 230 |
| Rate of Decrease of Viscosity during Spinning (%) | 3 | 4 |
| Spinning speed (m/min) | 3500 | 3500 |
| Spinning Ability 1 | A | A |
| Spinning Ability 2 | ≧7 | ≧7 |
| Draw temperature (° C.) | 110 | 110 |
| Draw magnification factor | 1.70 | 1.70 |
| Set temperature (° C.) | 145 | 145 |
| Spinning Ability 3 | A | A |
| Fluffs | ○ | ○ |
| Productivity of Filament | A | A |
| Tensile Strength (cN/dtex) | 4.43 | 4.38 |
| Elongation (%) | 30.3 | 30.8 |
| Contraction Ratio in Boiling Water (%) | 9.8 | 14.8 |
| Birefringence $\Delta$n | 0.0350 | 0.0367 |
| Peak temperature of thermal stress (° C.) | 90 | 91 |
| Fatigue after dyeing | A | A |

TABLE 2-4

| No. 2- | Comparative Example | | | | |
|---|---|---|---|---|---|
| | 10 | 11 | 12 | 13 | 14 |
| Monomer Content (% by weight) | 0.26 | 0.26 | 0.25 | 0.24 | 0.27 |
| Relative Viscosity of Polymer ($\eta$rel) | 3.04 | 2.58 | 4.02 | 4.03 | 3.02 |
| Branched Structure | Yes | Non | Non | Yes | Non |
| Sn Content (ppm) | 19 | 18 | 20 | 18 | 21 |
| L-isomer (mol %) | 99.0 | 96.4 | 97.0 | 98.7 | 92.6 |
| Mw | $14.8 \times 10^4$ | $10.2 \times 10^4$ | $23.8 \times 10^4$ | $24.0 \times 10^4$ | $14.5 \times 10^4$ |
| Mn | $7.6 \times 10^4$ | $5.4 \times 10^4$ | $12.1 \times 10^4$ | $12.4 \times 10^4$ | $7.1 \times 10^4$ |
| Spinning Temperature (° C.) | 230 | 230 | 245 | 245 | 230 |
| Rate of Decrease of Viscosity during Spinning (%) | 6 | 8 | 15 | 20 | 3 |
| Spinning speed (m/min) | 3500 | 3500 | 3500 | 3500 | 3500 |
| Spinning Ability 1 | B | B | C | C | A |
| Spinning Ability 2 | 4 | 4 | 5 | 3 | ≧7 |
| Draw temperature (° C.) | 110 | 110 | 110 | 110 | 110 |
| Draw magnification factor | 1.70 | 1.70 | 1.70 | 1.70 | 1.70 |
| Set temperature (° C.) | 145 | 145 | 145 | 145 | 145 |
| Spinning Ability 3 | B | C | C | C | B |
| Fluffs | × | × | × | × | × |
| Productivity of Filament | C | B | C | C | B |
| Tensile Strength (cN/dtex) | 3.51 | 3.37 | 3.55 | 3.41 | 2.67 |
| Elongation (%) | 29.6 | 28.7 | 30.2 | 29.8 | 30.3 |
| Contraction Ratio in Boiling Water (%) | 10.2 | 10.1 | 9.7 | 10.2 | 30.5 |
| Birefringence $\Delta$n | 0.0276 | 0.0265 | 0.0289 | 0.0266 | 0.0235 |
| Peak temperature of thermal stress (° C.) | 82 | 81 | 81 | 82 | 80 |
| Fatigue after dyeing | C | B | B | C | C |

EXAMPLES 2-8 TO 2-10, COMPARATIVE EXAMPLES 2-15 TO 2-19

Tables 2-5 and 2-6 show the results of spinning work efficiency and properties of the multifilament of the polylactic acid polymer having a relative viscosity of 3.09, L-isomer content of 98.2 mol % and monomer content of 0.26% by weight without any branched structure based on the results in Tables 2-1 to 2-4 when the spinning and drawing conditions are changed.

While Example 2-8 and Comparative Example 2-15 show the results obtained by changing the draw magnification factor of the fibers spun under the same condition, the fiber with the draw magnification factor of 1.3 or less in Comparative Example 2-15 has so low tensile strength and birefringence that the multifilament thereof is not suitable for practical applications.

Comparative Example 2-16 shows the result obtained by reducing the spinning speed to 2,800 m/min. However, crystal orientation is so insufficient at a reel speed of 2800 m/min that the fiber cannot endure the draw temperature, and break of fiber often occurs to make productivity of the multifilament low for practical purposes.

Example 2-9 and Comparative Example 2-17 show the results obtained by changing the draw temperature after reeling the fibers under the same condition. Since the draw temperature in Comparative Example 2-17 is lower than 100° C., break of fibers and generation of fluffs are often observed due to insufficient draw temperature. The fiber obtained has so low tensile strength and birefringence that it is not practically applicable.

Example 2-9 and Comparative Example 2-18 show the results obtained by changing the set temperature after reeling the fibers under the same condition. Since the contraction ratio in boiling water is as high as 20% or more due to lower set temperature than 125° C. in Comparative Example 2-18, the fiber is not practically applicable because the dimensional stability in post-processing such as dyeing is poor.

Comparative Example 2-19 shows the results obtained by spinning at a speed exceeding 4,500 m/min. Although vibration of fibers, uneven fibers by cooling and break of fibers are often observed at a spinning speed of 4,800 m/min to make the fiber practically inapplicable, any problems are seen with respect to spinning and drawing at the spinning speed of 4,500 m/min in Example 2-10, and the multifilament obtained had good physical and chemical properties.

TABLE 2-5

|  | Example | | |
|---|---|---|---|
| No. 2- | 8 | 9 | 10 |
| Spinning Temperature (° C.) | 230 | 230 | 230 |
| Rate of Decrease of Viscosity during Spinning (%) | 3 | 3 | 3 |
| Spinning speed (m/min) | 3200 | 4000 | 4500 |
| Spinning Ability 1 | A | A | A |
| Spinning Ability 2 | ≧7 | ≧7 | ≧7 |
| Draw temperature (° C.) | 105 | 115 | 120 |
| Draw magnification factor | 1.7 | 1.5 | 1.3 |
| Set temperature (° C.) | 145 | 135 | 150 |
| Spinning Ability 3 | A | A | A |
| Fluffs | ○ | ○ | ○ |
| Productivity of Filament | A | A | A |
| Tensile Strength (cN/dtex) | 4.32 | 4.45 | 4.50 |
| Elongation (%) | 27.6 | 28.9 | 30.0 |
| Contraction Ratio in Boiling Water (%) | 10.2 | 9.8 | 9.7 |
| Birefringence Δn | 0.0332 | 0.0386 | 0.0394 |
| Peak temperature of thermal stress (° C.) | 87 | 92 | 93 |
| Fatigue after dyeing | A | A | A |

TABLE 2-6

|  | Comparative Example | | | | |
|---|---|---|---|---|---|
| No. 2- | 15 | 16 | 17 | 18 | 19 |
| Spinning Temperature (° C.) | 230 | 230 | 230 | 230 | 230 |
| Rate of Decrease of Viscosity during Spinning (%) | 3 | 3 | 3 | 3 | 3 |
| Spinning speed (m/min) | 3200 | 2800 | 4000 | 4000 | 4800 |
| Spinning Ability 1 |  |  |  |  | × |
| Spinning Ability 2 | ≧7 | ≧7 | ≧7 | ≧7 | ≧7 |
| Draw temperature (° C.) | 105 | 105 | 90 | 105 | 120 |
| Draw magnification factor | 1.2 | 1.9 | 1.5 | 1.5 | 1.3 |
| Set temperature (° C.) | 150 | 150 | 150 | 115 | 150 |
| Spinning Ability 3 | C | C | B | A | C |
| Fluffs | × | × | × | ○ | × |
| Productivity of Filament | C | C | B | B | C |
| Tensile Strength (cN/dtex) | 2.83 | 3.64 | 3.50 | 4.30 | 4.18 |
| Elongation (%) | 35.0 | 27.6 | 27.4 | 28.6 | 25.4 |
| Contraction Ratio in Boiling Water (%) | 15.0 | 11.7 | 10.5 | 20.7 | 9.8 |
| Birefringence Δn | 0.0251 | 0.0271 | 0.0281 | 0.0310 | 0.0364 |
| Peak temperature of thermal stress (° C.) | 78 | 81 | 79 | 83 | 90 |
| Fatigue after dyeing | C | B | B | C | B |

EXAMPLE 3-1 AND 3-2, COMPARATIVE EXAMPLES 3-1 TO 3-8

Each polylactic acid polymer was melted at a given temperature and spun from a nozzle with a nozzle diameter of 0.3 mm. The fiber was reeled at a speed of 3,000 m/min followed by drawing to prepare a multifilament with a size of 84 dtex/24f, and dye affinity of the fiber was evaluated.

Comparative Examples 3-1 and 3-2 show the results when the contents of residual Sn and monomers are large. Spinning ability is not so good due to large decrease of viscosity during spinning when the contents of residual Sn or monomers are large. Generation of fluffs was observed during drawing and pilling was observed during dyeing, respectively, to make the quality of the filament poor.

The quality of the fiber in Comparative Example 3-3 was poor since the tensile strength was low and generation of fluffs was observed due to low viscosity and molecular weight (Mw and Mn) of the polymer. The quality of the fiber in Comparative Example 3-4 was also poor since the viscosity and molecular weight (Mw and Mn) of the polymer was so high that the spinning temperature was forced to be elevated, thereby causing large decrease of viscosity during spinning, and generating fluffs during drawing and pilling during dyeing.

While Comparative example 3-5 shows the polymer having similar properties as the polymer in Example 1 except the presence/absence of the branched structure, the fiber obtained from the polymer having the branched structure in Comparative Example 3-5 generated fluffs during drawing and dye affinity was poor.

In Comparative Examples 3-7 and 3-8, and in Examples 3-1 and 3-2, heat-setting after drawing was applied using a roller heater in the examples and using a plate heater in the comparative examples for the comparative purposes. The drawing points in the filament are not fixed in the filament heat-set using the plate heater, inert content and irregular dying are not improved by changing the set temperature, and the filament was irregularly dyed to make the filament quality poor. Dye affinity was good, on the contrary, in the filament prepared by roller heater setting without arising irregular dying.

TABLE 3-1

|  | Comparative Example | | | | | | | |
|---|---|---|---|---|---|---|---|---|
| No.3- | 1 | 2 | 3 | 4 | 5 | 6 | 7 | 8 |
| Sn Content (ppm) | 62 | 18 | 16 | 15 | 19 | 21 | 16 | 16 |

TABLE 3-1-continued

|  | Comparative Example | | | | | | | |
|---|---|---|---|---|---|---|---|---|
| No.3- | 1 | 2 | 3 | 4 | 5 | 6 | 7 | 8 |
| Relative Viscosity of Polymer ($\eta$rel) | 2.94 | 2.92 | 2.50 | 4.02 | 3.04 | 3.05 | 3.05 | 3.05 |
| Monomer Content (% by weight) | 0.24 | 1.02 | 0.25 | 0.24 | 0.26 | 0.27 | 0.24 | 0.24 |
| Mw/$10^4$ | 13.5 | 14.4 | 10.0 | 23.8 | 14.8 | 14.5 | 14.8 | 14.8 |
| M/$10^4$ | 6.6 | 7.0 | 5.0 | 12.1 | 7.6 | 7.1 | 7.6 | 7.6 |
| Branched Structure | Non | Non | Non | Non | Yes | Non | Non | Non |
| L-isomer (mol %) | 95.5 | 98.2 | 97.6 | 97.0 | 99.0 | 92.6 | 98.6 | 98.6 |
| Spinning Temperature (° C.) | 230 | 230 | 230 | 245 | 230 | 230 | 230 | 230 |
| Rate of Decrease of Viscosity during Spinning (%) | 18 | 10 | 16 | 15 | 6 | 3 | 4 | 4 |
| Draw magnification factor | 1.7 | 1.7 | 1.7 | 1.7 | 1.7 | 1.7 | 1.7 | 1.7 |
| roller heater (1) ° C. | 110 | 110 | 110 | 110 | 110 | 110 | 110 | 110 |
| roller heater (2) ° C. | 135 | 135 | 135 | 135 | 135 | 135 | — | — |
| plate heater ° C. | — | — | — | — | — | — | 135 | 115 |
| Tensile strength (cN/dtex) | 2.65 | 3.34 | 2.83 | 3.55 | 3.51 | 2.67 | 4.52 | 4.55 |
| Elongation (%) | 26.3 | 27.6 | 26.8 | 30.2 | 29.6 | 30.3 | 30.3 | 30.5 |
| Contraction ratio in boiling water (%) | 11.2 | 10.2 | 10.2 | 10.3 | 10.2 | 30.5 | 9.6 | 15.0 |
| inert (U %) | 1.78 | 1.23 | 1.83 | 1.82 | 1.54 | 1.56 | 3.80 | 2.50 |
| Uneven fiber (%) | ±6 | ±5 | ±5 | ±6 | ±5 | ±5 | ±15 | ±10 |
| Fluffs | × | × | × | × | × | ○ | ○ | ○ |
| dye affinity | × | × | × | × | × | × | × | × |

TABLE 3-2

|  | Example | |
|---|---|---|
| No. 3- | 1 | 2 |
| Sn Content (ppm) | 16 | 16 |
| Relative Viscosity of Polymer ($\eta$rel) | 3.05 | 3.05 |
| Monomer Content (% by weight) | 0.24 | 0.24 |
| Mw/$10^4$ | 14.8 | 14.8 |
| M/$10^4$ | 7.6 | 7.6 |
| Branched Structure | Non | Non |
| L-isomer (mol %) | 98.6 | 98.6 |
| Spinning Temperature (° C.) | 230 | 230 |
| Rate of Decrease of Viscosity during Spinning (%) | 4 | 4 |
| Draw magnification factor | 1.7 | 1.7 |
| roller heater (1) ° C. | 110 | 110 |
| roller heater (2) ° C. | 135 | 150 |
| plate heater ° C. | — | — |
| Tensile strength (cN/dtex) | 4.54 | 4.57 |
| elongation (%) | 28.7 | 27.6 |
| Contraction ratio in boiling water (%) | 9.6 | 8.0 |
| inert (U %) | 1.20 | 1.19 |
| uneven fiber (%) | ±5 | ±5 |
| Fluffs | ○ | ○ |
| dye affinity | ○ | ○ |

(Staple Fiber and Producing Process Thereof)

Staple fiber and producing processes thereof will be described in detail hereinafter.

Although staple fibers comprising polylactic acid compositions and producing processes thereof have been disclosed, most of them were in laboratory levels, and conditions for industrial production have not been made clear.

However, assay of the L-isomer in the polylactic acid as a starting material, prescription of the degree of polymerization of the polymer, the content of monomers, catalyst and molecular structure as well as rate of thermal contraction of the staple fibers are crucial factors for practical production and applications.

Japanese Patent Application Laid-open No. 6-212511 and 7-11515 disclose briefly spinning and drawing processes of poly-L-lactic acid with different melt flow rates (MFR), and viscosity characteristics during melt-spinning of aliphatic polyesters. However, since most of various conditions required at the practical production site have not been made clear, it is currently impossible to obtain practically applicable polylactic acid staple fibers.

The present invention provides staple fibers of the polylactic acid composition capable of practical applications with good productivity by using the polylactic acid composition having selected properties. More particularly, the present invention provides the staple fibers of the polylactic acid composition having good thermal contraction characteristics, an excellent tensile strength and good crimp properties as well as processing stability, and a process for producing the same.

Although the polylactic acid composition according to the present invention use L-lactic acid or D-lactic acid, or L-lactide or D-lactide as a dimer of lactic acid, or mesolactide as a starting material, it is crucial that the composition contains 95 mol % or more, preferably 98 mol % or more, of the L-isomer. Increasing the proportion of the D-isomer makes the polymer amorphous, and physical and chemical properties of the fiber obtained is deteriorated due to poor crystal orientation by spinning and drawing. The tensile strength is particularly decreases and heat contraction ratio increases to make the fiber to be practically inapplicable.

The polylactic acid composition according to the present invention has a relative viscosity of 2.7 to 3.9. A sufficient tensile strength cannot be obtained due to poor heat resistance of the polymer when the relative viscosity is lower than this range. When the relative viscosity is higher than this range, on the contrary, the spinning temperature is forced to be elevated to cause thermal degradation of the polymer during spinning. Accordingly, the relative viscosity is preferably in the range of 2.9 to 3.6, more preferably 2.9 to 3.6, because the relative viscosity in this range permits heat degradation during spinning to be small.

The lower the rate of decrease of relative viscosity during spinning is desirable, and the preferable rate is 7% or less. The polymer is seldom decomposed and break of fibers hardly occurs during spinning when the rate of decrease of the relative viscosity is less than 7%, thereby enabling good spinning ability to be attained and the tensile strength in the drawing step to be large.

The weight average molecular weight Mw and number average molecular weight Mn of the polylactic acid composition according to the present invention are preferably in the ranges of 120,000 to 220,000 and 60,000 to 110,000, respectively. While the molecular weight in this range affords good spinning ability and sufficient tensile strength to be attained, the molecular weight out of this range causes a large decrease in the molecular weight to fail in obtaining the objective tensile strength.

The polylactic acid composition according to the present invention has a monomer content of 0.5% by weight or less, preferably 0.3% by weight or less, and more preferably 0 or 0.2% by weight or less. The monomer as determined in the present invention refers to the component having a molecular weight of 1,000 or less as determined by a GPC assay. Throughput of the process extremely decreases at a monomer content of more than 0.5% by weight, because heat decomposition of the monomer decreases heat resistance of the polylactic acid composition.

For reducing monomer content in the polylactic acid composition, unreacted monomers are removed by evacuating the reaction vessel at immediately before completion of the polymerization reaction, polymerized chips are washed with an appropriate solvent, or the polylactic acid is manufactured by solid state polymerization.

The polylactic acid composition according to the present invention is required to contain 30 ppm or less of Sn, preferably 0 or 20 ppm or less, in the polymer. While an Sn based catalyst is used as a polymerization catalyst of the polylactic acid composition, a content of Sn of more than 30 ppm allows spinning work efficiency to be markedly reduced since the filtration pressure at the nozzle rapidly increases du to depolymerization during spinning.

For reducing the content of Sn, the content of Sn for polymerization is reduced or the chips obtained are washed with an appropriate solvent.

It is crucial that the polylactic acid composition according to the present invention has a linear polymer structure, or substantially has no branched structure. Although a small amount of branching agent was added for improving melt viscosity and degree of polymerization in polymerizing the polylactic acid composition in the conventional proposal, it was confirmed by the inventors of the present invention that the branched structure of the polylactic acid composition has far more negative effect on spinning work efficiency than the conventional synthetic fiber, for example a polyester fiber, has. In other words, the polylactic acid composition containing even a trace amount of the branched structure has poor spinning work efficiency and smaller tensile strength as compared with the composition having no branched structure.

It is recommended not to use such agents as forming a branched structure at all in the polymer material, for example three valent or four valent alcohols and carboxylic acids. When a component having the structure as described above is forced to use for some reasons, the quantity thereof should be restricted within as small range as possible that does not affect spinning work efficiency.

Polylactic acid to be used in the present invention preferably exhibits a mass reduction of 5% at a temperature of 300° C. or more. Thermal degradation in producing and processing textiles may be more prevented as TG (5%) is higher.

While commonly used resin components other than polylactic acid may be used in the polylactic acid staple fiber according to the present invention, biodegradable resin materials such as aliphatic polyesters are preferably used for the biodegradable staple fiber.

The staple fiber of the polylactic acid composition according to the present invention is manufactured by the steps of melt-spinning the polylactic acid composition by a conventional method, drawing under a condition to be described hereinafter, mechanically crimping the spun fiber, and cutting into staples after heat-treatment.

The melt-spin temperature is preferably 215 to 250° C. Melt-extrusion is easy at a temperature of 215° C. or more, and decomposition may be remarkably suppressed at a temperature of 250° C. or less, thereby enabling high strength staple fibers to be obtained.

The fiber after melt-spinning are cooled to ensure a desired crystal orientation, and are housed in a cans as non-drawn fibers at a speed of 600 to 1200 m/min. A speed less than 600 m/min makes reeling difficult due to insufficient tension of the fiber, while a speed exceeding 1,200 m/min make it difficult to house in a cans due to high speed spinning. The speed is preferably 900 to 1,100 m/min.

The non-drawn fiber is drawn by one or two steps at a draw temperature of 50 to 98° C. and draw magnification factor of 3.0 to 5.0, preferably 3.5 to 4.5. A draw magnification factor of less than 3.0 is not practical since the elongation is too large, while the elongation reduces and mechanical load increases and productivity of drawing reduces when the draw magnification factor exceeds 5.0.

While the draw magnification factor is different depending on the spinning speed and required performance of the staple fiber, it is adjusted so that a fiber having a tensile strength of 2.6 cN/dtex or more and an elongation of 80% or less is obtained.

The heat treatment may be applied before or after the crimp processing. The heat treatment temperature is adjusted to 110 to 150° C., preferably 120 to 140° C., for adjusting the heat contraction ratio at 120° C. within 5.0%.

The thermal contraction ratio of the fiber of the polylactic acid composition staple fiber according to the present invention at 120° C. is preferably 5.0% or less, more preferably 3.0% or less. The fiber becomes suitable for practical applications when the thermal contraction ratio at 120° C. is 5.0% or less, since contraction by heat treatment of the fabric and dyeing hardly occurs and feeling of the fabric is suppressed from changing when the staple fiber is processed into a textile product of the spun fiber. The fiber may be used for the short staple nonwoven fabric through a dry or wet process, irrespective of thermosetting temperatures.

The staple fiber of the polylactic acid composition according to the present invention preferably has a tensile strength of 2.6 cN/dtex or more, more preferably 3.5 cN/dtex or more. The tensile strength of 2.6 cN/dtex or more is preferable because no troubles are encountered in the processing step and in practical uses with a sufficient strength of the final product.

Practically preferable elongation is 80% or less, more preferably 60% or less.

The number of crimps of the fiber of the polylactic acid composition according to the present invention is preferably 4 to 18 crimps/25 mm, more preferably 6 to 15 crimps/25 mm. Non-dispersed part of the fiber hardly appears when the crimp number more than 4 crimps/25 mm, while generation of neps is suppressed when the crimp number is less than 18 crimps/25 mm.

When the fiber is endowed with crimps by a stuffing box method, tows before entering the crimper is pre-heated at 40 to 100° C., and the tows are passed through the crimper with a nip pressure of 0.2 to 0.4 MPa and a press pressure of 0.03 to 0.10 MPa to attain the crimp number as hitherto described.

The fiber is heat-treated at 120 to 140° C. for setting the objective thermal contraction ratio to 5.0% or less.

Oil may be coated before or after drying, and the fiber is cut with a cutter to form staple fibers. The staple fiber thus obtained is excellent in productivity while having good thermal contraction properties, tensile strength and crimp characteristics in addition to stability in processing.

The linear density (tex) of a single fiber is usually in the range of 0.6 to 22 dtex.

The staple fiber according to the present invention is processed as a woven or knit product by a conventional weave and knit process, or as a short staple nonwoven fabric by a dry or wet process.

EXAMPLES

The present invention will be described in detail with reference to examples.

The analysis processes of the polymer properties and measuring processes of the textile properties will be described first. The properties not described hereinafter have been measured and evaluated by the foregoing processes.

(Measurement of Thermal Contraction—Dry Method)

An initial load of 1.8 μN/dtex was given to a sample with a length of 25 mm to measure the initial length. Then, the length of the sample after treating with a hot-air dryer at 120° C. for 15 minutes (the sample length after contraction) was measured to determine the thermal contraction ratio by the equation below:

Thermal contraction ratio (%)=[(Initial sample length−Sample length after contraction)/Initial sample length]×100

EXAMPLE 4-1

Polylactic acid was synthesized by a conventional method using tin octylate as a polymerization catalyst with a starting material ratio of 98.7 mol % of L-lactide and 1.3 mol % of D-lactide. The polymer obtained had a relative viscosity of 3.02, weight average molecular weight Mw of 146,000 and number average molecular weight Mn of 72,000 with a monomer content of 0.27% by weight, Sn content of 18 ppm and heat stability temperature TG (5%) of 318° C.

The polymer was melt-spun at an extrusion mass rate of 715 g/min and spinning speed of 1,050 m/min at a spinning temperature of 230° C. from a spinning nozzle with a diameter of 0.27 mm and number of spinning holes of 1420. The non-drawn fiber was pulled into a cans after cooling by in an annular air stream. The rate of decrease of viscosity during spinning was 3% and the incidence of break of fibers was 0.73 times/ton.

After pre-heating the non-drawn fiber at 40° C., it was drawn at a draw magnification factor of 3.96 at 85° C. followed by heat-treating at 110° C. under a tension. Rill times of on the roller during drawing was a favorable value of 0.24 times/ton.

The drawn tows were crimped by introducing into a crimper (a nip pressure of 0.25 MPa, stuffing pressure of 0.05 MPa) while heating at 85° C. with steam. Then, the crimped tows were dried and heat-treated at 130° C. with a hot-air dryer. After coating with an oil, the tows were cut in to a length of 38 mm to obtain staple fibers with a liner density of 1.1 dtex. The staple fiber obtained had a thermal contraction ratio at 120° C. of 2.7%, a tensile strength of 4.0 cN/dtex or more, an elongation of 45.4%, and a number of crimps of 10.6 crimps/25 mm. Spinning ability of this staple fiber was good with satisfactory thermal characteristics and tensile strength of spun fiber. This staple fiber is mainly used for mix spinning with cotton.

COMPARATIVE EXAMPLE 4-1

Polylactic acid was synthesized by a conventional method using tin octylate as a polymerization catalyst with a mixing ratio of the starting materials of 99.0 mol % of L-lactide and 1.0 mol % of D-lactide together with 0.1 mol % of trimellitic acid as a cross-link agent.

The polymer obtained had a relative viscosity of 3.04, a weight average molecular weight Mw of 148,000, a number average molecular weight Mn of 76,000, a monomer content of 0.26% by weight and an Sn content of 19 ppm. The heat stability temperature TG (5%) was 315° C.

A non-drawn fiber was reeled under the same condition as in Example 4-1. Although the rate of decrease of viscosity during spinning was 6%, spinning ability was not good with an incidence of break of fibers of 2.43 times/ton.

The non-drawn fiber was drawn under the same condition as in Example 1, whereby rill on the roller during drawing was as poor as 1.21 times/ton.

EXAMPLE 4-2

Polylactic acid was synthesized by a conventional method using tin octylate as a polymerization catalyst with starting material ratios of 97.8 mol % of L-lactide and 2.2 mol % of D-lactide. The polymer obtained had a relative viscosity of 2.93, weight average molecular weight Mw of 125,000, number average molecular weight Mn of 66,000, monomer content of 0.26% by weight and Sn content of 26 ppm. The heat stability temperature TG (5%) was 317° C.

The polymer was melt-spun at a spinning temperature of 230° C., spinning speed of 950 m/min with an extrusion mass rate of 800 g/min from a spinning nozzle with a diameter of 0.40 mm and number of spinning holes of 820. The non-drawn fiber was pulled in cans after cooling in an annular air stream. The rate of decrease of viscosity during spinning was 5%, and incidence of break of fibers was 0.22 times/ton.

After preheating the non-drawn fiber at 40° C., the non-drawn fiber was drawn at a draw magnification factor of 3.74 at 82° C. Reeling on the roller showed a favorable level of 0.0 times/ton.

The drawn tows were crimped by introducing into a crimper (nip pressure of 0.27 MPa and stuffing pressure of 0.06 MPa) while heating them with steam at 85° C.

The crimped tows were dried and heat treated at 135° C. with a hot-air dryer and, after coating with an oil, were cut into a length of 51 mm with a bias length of 76 mm to obtain staple fibers with a linear density of 3.3 dtex. The staple fiber obtained had a thermal contraction ratio at 120° C. of 1.7%, tensile strength of 3.0 cN/dtex and elongation of 58.4% with a number of crimps of 10.9 crimps/25 mm.

The staple fiber was spun by mixing with wool. The spun fiber had satisfactory thermal characteristics and tensile strength, and the dyeing temperature was comparable to polyesters.

The staple fibers may be carded to use as a material of a nonwoven fabric after needle punch and heat treatment.

EXAMPLE 4-3

Polylactic acid was synthesized in a starting material composition of 96.8 mol % of L-lactide and 3.2 mol % of D-lactide by a conventional method using tin octylate as a polymerization catalyst.

The polymer obtained had a relative viscosity of 2.96, weight average molecular weight Mw of 138,000, number average molecular weight Mn of 80,000, monomer content of 0.47% by weight and Sn content of 19 ppm with a heat stability temperature TG (5%) of 302° C.

The polymer was melt-spun at a spinning temperature of 228° C. and spinning speed of 1,000 m/min with an extrusion mass rate of 800 g/min from a spinning nozzle having 320 holes in the shape of double C with a slit width of 0.15 mm. The spun fiber was cooled by blowing an annular air stream, and the non-drawn fiber was pulled in a cans. The rate of decrease of viscosity during spinning was 5%, and incidence of break of fibers was 0.0 times/ton.

After pre-heating the non-drawn fiber at 40° C., it was drawn at a draw magnification factor of 4.07 at 82° C. Reeling on the roller during drawing was a favorable level of 0.0 times/ton. The drawn tow was crimped by introducing into a crimper (nip pressure 0.22 MPa and stuffing pressure 0.05 MPa) by heating at 85° C. with steam.

The crimped tow was dried and heat-treated at 130° C. with a hot-air dryer. After coating with an oil, the tow was cut into a length of 51 mm to obtain a staple fiber with a linear density of 7.6 dtex.

The staple fiber obtained had a thermal contraction ratio at 120° C. of 3.5%, tensile strength of 3.4 cN/dtex or more, elongation of 48.2% and number of crimps of 8.2 crimps/25 mm.

The staple fiber smoothly passed through the card, and characteristics of the nonwoven fabric after needle punch and heat-treatment were satisfactory.

(Monofilament and Producing Process Thereof)

The invention with respect to the monofilament and producing process thereof will be described hereinafter.

Although the monofilament comprising the polylactic acid composition and producing process thereof have been disclosed, most of them are in a laboratory level, and conditions for industrial production have not been made clear.

However, studies of the composition of polylactic acid as a starting material, prescription of the degree of polymerization, monomer content, catalyst and molecular structure as well as thermal contraction characteristics of the monofilament will be crucial factors for practical production and applications in the textiles, for particularly monofilament comprising the polylactic acid composition.

While Japanese Patent Application Laid-open No. 7-90715 discloses the polymer viscosity of aliphatic polyesters during spinning and processes for modifying the polymer, conditions required in the practical production sites as described above have not been made clear. Therefore, it has been currently impossible to obtain practically applicable polylactic acid monofilament.

The present invention provides a practically applicable monofilament of the polylactic acid composition with good productivity by using the polylactic acid composition having selected properties. More particularly, the present invention provides monofilaments of the polylactic acid composition having good thermal contraction characteristics and tensile strength capable of stabile processing, and a process for producing the same.

While the polylactic acid composition according to the present invention uses L-lactic acid or D-lactic acid, or L-lactide or D-lactide as a dimer of lactic acid, or mesolactide as a starting material, it is crucial that the proportion of the L-isomer is 95 mol % or more, because an increase of the proportion of the D-isomer brings about an amorphous structure to inhibit crystal orientation during spinning and drawing from advancing, thereby making the properties of the textile obtained to be poor. In particular, the tensile strength is remarkably reduced while increasing thermal contraction ratio to make the product practically inapplicable.

The polylactic acid composition to be used in the monofilament according to the present invention has a relative viscosity (ηrel) of 2.7 to 4.5. Heat resistance of the polymer becomes poor when the relative viscosity is lower than this range to fail in obtaining a sufficient tensile strength, while the relative viscosity of higher than this range forces the spinning temperature to be elevated to cause heat degradation during spinning.

The range of the relative viscosity of 2.7 or more and 3.9 or less is preferable since heat degradation can be suppressed, and more preferable range is 3.1 to 3.7. However, heat degradation may be suppressed even when the relative viscosity exceeds 3.9 by adjusting the content of the L-isomer to 97% or more.

The lower rate of decrease of the relative viscosity in spinning is favorable, and a rate of 7% or less is preferable. When the rate of decrease of the relative viscosity is less than 7%, the polymer is seldom decomposed during spinning and break of fibers during spinning hardly occurs to enable the tensile strength to be large in the draw step with good spinning ability.

The polylactic acid composition according to the present invention has a preferable weight average molecular weight Mw of 120,000 to 220,000, more preferably 150,000 to 200,000, and a preferable number average molecular weight Mn of 60,000 to 110,000, more preferably 80,000 to 100,000. While a molecular weight within this range permits good spinning ability and sufficient tensile strength to be obtained, a large decrease of the molecular weight causes to make it impossible to obtain a required tensile strength when the molecular weight is out of this range.

The polylactic acid composition according to the present invention has a monomer content of 0.5% by weight or less, preferably 0.3% by weight or less and more preferably 0 or 0.2% by weight or less. The monomer as determined in the present invention is referred to as the monomer component having a molecular weight of 1,000 or less as determined by a GPC assay. The monomer content of exceeding 0.5% by weight markedly decreases work efficiency of the polymer, because the monomer component is decomposed by heat to decrease heat resistance of the polylactic acid composition.

For reducing the content of the monomer in the polylactic acid composition, the unreacted monomers are removed by evacuating the reaction vessel at immediately before completion of the polymerization reaction, the polymerized chips are washed with an appropriate solvent, or the polylactic acid is polymerized by solid state polymerization.

It is essential that the polylactic acid composition according to the present invention contains 30 ppm or less, preferably 0 or 20 ppm or less, of Sn in the polymer. While the Sn based catalyst is used as the polymerization catalyst of the polylactic acid composition, a content of Sn of exceeding 30 ppm allows the polymer to be depolymerized during spinning to rapidly increase filtration pressure of the spinning nozzle, thereby remarkably reducing work efficiency of spinning.

For reducing the content of Sn the amount of Sn for polymerization may be reduced, or the polymer may be washed with an appropriate solvent.

It is essential that the polylactic acid composition according to the present invention has a linear polymer structure, or substantially contains no branched structure. A small amount of branching agent have been added for polymerization of the polylactic acid composition for the purpose of improving the melt viscosity and degree of polymerization. However, it was confirmed by the inventors of the present invention that the branched structure of the polylactic acid composition far more negatively affects spinning work efficiency as compared with conventional monofilaments, for example polyester monofilaments. In other words, the polylactic acid composition containing even a small amount of the branched structure is poor in spinning work efficiency besides having a lower tensile strength than the structure without any branched structure.

For excluding the branched structure, it is recommended to avoid use of agents that arise the branched structure, for example three valent or four valent alcohols and carboxylic acids, in the polymer material. However, when a component having such structure is forced to use for some reasons, the amount should be restricted within a minimum essential range that does not affect work efficiency of spinning.

The polylactic acid to be used in the present invention is preferably has a mass reduction of 5% at a temperature of 300° C. or more, or has a heat stability temperature of TG (5%) of 300° C. or more. Thermal degraration in producing and processing textiles may be more prevented as TG is higher.

Although common resins other than polylactic acid may be used as starting materials in the polylactic acid monofilament according to the present invention, the material is preferably a biodegradable resin such as an aliphatic polyester for manufacturing a biodegradable monofilament.

The monofilament of the polylactic acid composition according to the present invention is manufactured by melt-spinning the polymer by a conventional method at 220 to 250° C. followed by cooling with water, and heat-treating after heat-drawing under the following conditions.

The melt-spinning temperature is preferably 220 to 250° C., because melt-extrusion becomes easy at a temperature of 220° C. or more, and decomposition is extremely suppressed at a temperature of 250° C. or less, thereby enabling a monofilament having a high tensile strength to be easily obtained.

The melt-spun filament is drawn at a prescribed temperature and draw magnification factor while cooling with water in order to facilitate a given crystal orientation, and the filament is reeled on a bobbin. The non-drawn filament is drawn by one or two steps or more in hot water at 70 to 100° C., preferably at 85 to 98° C.

The draw magnification factor is 6.0 or more, preferably 8.0 or more. The factor is different depending on the required performance of the filament, and is determined so that a filament having a tensile strength of 3.5 cN/dtex or more and elongation of 40.0% or less is obtained. The heat-treatment temperature is adjusted in the range of 100 to 150° C., preferably 120 to 140° C., for restricting the contraction ratio in boiling water to 10.0% or less.

The contraction ratio in boiling water of the monofilament of the polylactic acid composition according to the present invention is preferably 10.0% or less, more preferably 8.0% or less.

The filament is favorable for practical uses since the filament is hardly contracted by heat-treatment without causing no changes in the feeling when the contraction ratio in boiling water is 10.0% or less. There will be also no problem of making the use of the textile impossible depending on the heat-setting temperature.

The monofilament of the polylactic acid composition according to the present invention preferably has a tensile strength of 3.5 cN/dtex or more, more preferably 4.4 cN/dtex or more.

No troubles will be encountered in the processing steps when the tensile strength is 3.5 cN/dtex or more with a sufficient strength of the final product to exclude troubles in practical applications.

The elongation is preferably 40.0% or less, more preferably 35.0% or less, from the practical point of view.

The birefringence $\Delta n$ after drawing is preferably 0.0250 or more, more preferably 0.0330 or more. Crystal orientation sufficiently advances and contraction ratio in boiling water is properly suppressed when the filament has a birefringence $\Delta n$ of 0.0250 or more.

The monofilament obtained as described above is excellent in productivity while having practically applicable thermal contraction ratio and tensile strength as well as stability in processing.

The monofilament usually has a linear density of 220 to 1,100 dtex.

The monofilament according to the present invention can be used as woven and knit fabrics manufactured by the process known in the art.

EXAMPLES

The present invention will be described hereinafter in detail. Each measuring process is as hitherto described.

EXAMPLE 5-1

Polylactic acid was synthesized by the conventional method using tin octylate as a polymerization catalyst with a starting material ratio of 96.0 mol % of L-lactide and 4.0 mol % of D-lactide.

The polymer obtained had a relative viscosity of 3.7, weight average molecular weight Mw of 195,000, number average molecular weight Mn of 94,000, monomer content of 0.27% or less by weight and Sn content of 17 ppm with a heat stability temperature (5%) of 319° C.

The polymer was melted at 220° C. in a single screw extruder, and was extruded from a nozzle having 18 spinning holes with a diameter of 1.2 mm. After allowing the filament to pass through a cooling water bath, it was subjected to a first step drawing at a draw magnification factor of 5.5 in hot water at 94° C., and to a second step drawing at a draw magnification factor of 1.2 in hot water at 98° C., followed by heat-setting in a hot air stream at 130° C. to manufacture a monofilament with a linear density of 560 dtex.

The monofilament obtained had a contraction ratio in boiling water of 9.3%, tensile strength of 4.4 cN/dtex, elongation of 36%, and birefringence $\Delta n$ of 0.0325. The rate of decrease of viscosity during spinning was 4%, suggesting small amount of decomposition of the polymer during spinning to result in substantially no break of fibers.

The contraction ratio in boiling water of 10.0% or less allows the woven and knit fabric to hardly contract by heat-treatment without any changes in the feeling, thus making the product to be practically applicable. No troubles of making the fabric unusable by the heat-setting temperature was encountered. The tensile strength of 3.5 cN/dtex or more prevents troubles in the processing steps from occurring, and allows the strength of the final product to be sufficient without generating practical problems. The elongation of 40.0% or less is suitable for practical applications. The birefringence of 0.0320 or more indicate well advanced crystal orientation and adequately suppressed contraction ratio in boiling water.

COMPARATIVE EXAMPLE 5-1

Polylactic acid was synthesized by the conventional method using L-lactide and D-lactide as starting materials and tin octylate as a polymerization catalyst, and by adding 0.1 mol % of trimellitic acid as a cross-linking agent.

The polymer obtained contained 95.5 mol % of the L-isomer and had a relative viscosity of 3.7, weight average molecular weight Mw of 185,000, number average molecular weight Mn of 92,000, monomer content of 0.8% by weight and Sn content of 16 ppm with a thermal stability temperature (5%) of 320° C.

The polymer was melted at 220° C. in a single screw extruder and extruded from a nozzle having 18 spinning holes with a diameter of 1.2 mm.

The filament was passed through a water cooling bath, subjected to a first step drawing with a draw magnification factor of 5.5 in hot water at 94° C. and second step drawing with a draw magnification factor of 1.2 in hot water at 98° C., and heat set at 130° C. in a hot air stream to manufacture a monofilament with a linear density of 560 dtex. However, this filament was poor in spinning ability with high incidence of break of fibers due to large proportion of cross-linked polylactic acid.

EXAMPLE 5-2

Polylactic acid was synthesized by a conventional method with a starting material ratio of 95.7 mol % of L-lactide and 4.3 mol % of D-lactide using tin octylate as a polymerization catalyst.

The polymer obtained had a relative viscosity of 3.3, weight average molecular weight Mw of 174,000, number average molecular weight Mn of 91,000, monomer content of 0.20% by weight or less and Sn content of 16 ppm with a heat stability temperature (5%) of 319° C.

The polymer was melted at 220° C. in a single screw extruder, and extruded from a nozzle having 18 spinning holes with a diameter of 1.2 mm. The filament was passed through a water cooling bath, and subjected to the first step drawing at a draw magnification factor of 6.0 in hot water at 94° C. and second step drawing at a draw magnification factor of 1.5 in hot water at 98° C. The drawn filament was heat-set at 130° C. in a hot air stream to manufacture a monofilament with a linear density of 560 dtex.

The monofilament obtained had a contraction ratio in boiling water of 6.7%, tensile strength of 5.1 cN/dtex, elongation of 33.0% and birefringence Δn of 0.0350. The rate of decrease of viscosity during spinning of 4% suggests a small amount decomposition of the polymer during spinning with substantially no break of fibers.

The contraction ratio in boiling water of 10.0% or less affords practically favorable woven and knit products due to seldom contraction during heat-treatment with no changes in feeling. Troubles such that the product becomes unusable by heat-setting temperature could be also avoided.

The tensile strength of 3.5 cN/dtex or more hardly arises troubles in the processing steps with sufficient strength in the final products avoiding any troubles in practical applications. The elongation of 40.0% or less was practically favorable.

The birefringence of 0.0320 or more indicates sufficiently advanced crystal orientation to adequately suppress the contraction ratio in boiling water.

EXAMPLE 5-3

Polylactic acid was synthesized by the conventional method using tin octylate as a polymerization catalyst with a starting material ratio of 98.9 mol % of L-lactide and 1.1 mol % of D-lactide.

The polymer obtained had a relative viscosity of 4.5, weight or less average molecular weight of 230,000, number average molecular weight of 116,000, monomer content of 0.2% by weight or less and Sn content of 16 ppm with a heat stability temperature (5%) of 319° C.

The polymer was melted at 228° C. in a single screw extruder, and extruded from a nozzle having 18 spinning holes with a diameter of 1.2 mm. The filament was passed through a water cooling bath, and subjected to the first step drawing with a draw magnification factor of 6.0 in hot water at 98° C. and the second step drawing with a draw magnification factor of 1.85 in hot water at 98° C. with a total draw magnification factor of 11.1. The filament was heat-set in a hot air stream at 130° C. to manufacture a monofilament with a linear density of 560 dtex.

The monofilament obtained had a contraction ratio in boiling water of 4.2%, contraction ratio after hot air treatment at 100° C. of 3.1%, tensile strength of 5.15 cN/dtex and elongation of 28.0%. The rate of decrease of viscosity during spinning of 4% suggests small amount of decomposition of the polymer during spinning to substantially arise no break of fibers.

The contraction ratio in boiling water of 6.0% or less and contraction ratio after hot air treatment at 100° C. of 4.0% afford woven and knit products that scarcely arise contraction during heat-treatment. The product substantially shows no changes of feeling that makes the product practically favorable.

The tensile strength of 4.85 cN/dtex or more can prevent troubles in the processing steps with sufficient strength of the final product without any practical problems. The elongation of 30.0% or less was practically favorable.

(Flat Yarn and Producing Process Thereof)

The flat yarn and producing process thereof according to the present invention will be described hereinafter.

In textile products from the polylactic acid composition, in particular the flat yarn among them, the composition of polylactic acid as a starting material, prescription of the degree of polymerization of the polymer, the monomer content, catalyst and molecular structure as well as thermal contraction characteristics of the flat yarn are crucial factors for practical producing and uses.

For example, Japanese Patent No. 2733184 discloses a flat yarn manufactured by melt extrusion molding of an aliphatic polyester comprising glycolic acid and polybasic acid as constituents. However, only the prior art is described with respect to lactic acid, and no detailed explanation is made in the patent. Conditions required at practical production sites have not been made clear. Therefore, it is currently impossible to obtain practically applicable polylactic acid flat yarns.

The present invention provides a practically applicable polylactic acid flat yarn with high productivity by using a polylactic acid composition having selected properties. More particularly, the present invention provides a polylactic acid flat yarn having good thermal contraction characteristics and high tensile strength as well as stability in processing and producing process thereof.

While the starting material of the polylactic acid composition according to the present invention comprises L-lactic acid or D-lactic acid, or L-lactide or D-lactide as a dimer of lactic acid, or mesolactide, it is crucial that the proportion of the L-isomer is 95 mol % or more. This is because increased proportion of the D-isomer results in an amorphous structure, which prevent crystal orientation by drawing from advancing to make the properties of the textile obtained poor. The tensile strength particularly decreases while increasing the thermal contraction ratio to make practical applications of the textile impossible.

The polylactic acid composition according to the present invention has a relative viscosity (ηrel) of 2.7 to 4.5. The melt-extrusion temperature should be elevated when the viscosity exceeds the upper limit to consequently increase thermal degradation while, when the viscosity is below the lower limit, heat resistance of the polymer becomes too poor to obtain a sufficient tensile strength. Accordingly, the preferable range of the relative viscosity is 3.3 to 4.3.

The lower the rate of decrease of viscosity during melt extrusion is favorable, and preferable rate is 7% or less. The polymer is not substantially decomposed by melt-extrusion when the rate of decrease of viscosity during melt extrusion is 7% or less to exclude irregular films from being formed by melt-extrusion. Accordingly, a film having a high tensile strength during drawing may be formed with good film forming ability.

The polylactic acid composition according to the present invention preferably has a weight average molecular weight Mw of 125,000 to 230,000, more preferably 174,000 to 215,000, and number average molecular weight Mn of 73,000 to 116,000, more preferably 91,000 to 107,000. The molecular weight in this range permits good film forming ability and high tensile strength to be obtained.

The polylactic acid composition according to the present invention contains 0.5% by weight or less, preferably 0.3% by weight or less, and more preferably 0 or 0.2% by weight or less of monomers. The monomer as determined in the present invention refers to as a monomer component having a molecular weight of 1000 or less as determined by a GPC assay. The monomer content of 0.5% by weight or less is preferable for attaining high work efficiency, because heat resistance of the polylactic acid composition becomes more excellent as the content of the heat-decomposed monomer component is smaller.

For reducing the monomer content in the polylactic acid composition, unreacted monomers may be removed by evacuating the reaction vessel immediately before completing the polymerization reaction, polymerized chips may be washed with an appropriate solvent, or polylactic acid is prepared by solid phase polymerization.

The content of Sn in the polylactic acid composition according to the present invention is required to be 30 ppm or less, preferably 0 or 20 ppm or less. While the Sn based catalyst is used as a polymerization catalyst of the polylactic acid composition, a content of 30 ppm or less permits filtration pressure at the nozzle to be suppressed from increasing due to small amount of depolymerization during melt-extrusion to make the polymer excellent in melt-extrusion ability.

For reducing the content of Sn, the proportion of Sn used in polymerization is reduced, or the chips are washed with an appropriate solvent.

It is essential that the polylactic acid composition according to the present invention has a linear polymer structure, or substantially has no branched structure. It has been proposed to add a small amount of a branching agent for preparing the polylactic acid composition in order to improve the melt viscosity and degree of polymerization. However, it was confirmed by the inventors of the present invention that the branched structure of the polylactic acid composition far more negatively affects film forming ability as compared with conventional flat yarns, for example polyester flat yarns. In other words, it is a problem that work efficiency for forming the film becomes poor in the polylactic acid composition containing even a small quantity of branched structures, and tensile strength of the film is lower as compared with the film having no branched structures.

For excluding the branched structure, it is recommended to avoid use of agents that arise the branched structure, for example three valent or four valent alcohols and carboxylic acids, in the polymer material. However, when a component having such structure is forced to use for some reasons, the amount should be restricted within a minimum essential range that does not affect the film forming ability.

Polylactic acid to be used in the present invention preferably has a temperature for reducing the polymer mass by 5%, or TG (5%), of 300° C. or more. The higher TG (5%) is, the more heat degradation in producing and processing the flat yarn may be prevented.

Although common resins other than polylactic acid may be used as starting materials in the polylactic acid flat yarn according to the present invention, the material is preferably a biodegradable resin such as an aliphatic polyester for manufacturing a biodegradable flat yarn.

While the flat yarn of the polylactic acid composition according to the present invention may be manufactured by a process known in the art using the polymer of the polylactic acid composition, one example of the producing process comprises solidifying by cooling after melt-extrusion, and hot-drawing under the conditions to be described below followed by heat-treatment.

The melt-extrusion temperature is preferably in the range of 180 to 250° C. A melt-extrusion temperature of 180° C. or more makes melt-extrusion easy, while a temperature of 250° C. or less extremely prevent decomposition, thereby enabling a flat yarn having a high tensile strength to be easily obtained.

The melt-extruded film is cooled to attain a desired crystal orientation, and drawn at a prescribed temperature and draw magnification factor followed by reeling on a bobbin after heat-treatment. The film is slit into ribbons, which are drawn by one or two steps at 80 to 130° C., preferably at 100 to 120° C.

The draw magnification factor is 4.0 or more, preferably 5.0 or more. Although the factor differs depending on the required performance of the objective flat yarn, it is determined so that a flat yarn having a tensile strength of 2.6 cN/dtex or more and elongation of 40.0% or less is obtained.

The flat yarn is preferably heat-treated at 100 to 150° C., more preferably at 110 to 140° C., for adjusting the contraction ratio after heat-treatment at 80° C. for 10 minutes to 5.0% or less.

The flat yarn of the polylactic acid composition according to the present invention preferably has preferably a contraction ratio of 5.0% or less, more preferably 3.0% or less, after heat-treating the flat yarn at 80° C. for 10 minutes. The contraction ratio of 5.0% or less after heat-treating the flat yarn at 80° C. for 10 minutes allows contraction by heat-treatment to be hardly occurs when the yarn is processed into woven and knit fabrics without any changes of feeling. Therefore, the fabric is favorable for use by excluding the problems that the fabric becomes unusable by heat-setting temperature.

The flat yarn of the polylactic acid composition according to the present invention preferably has a tensile strength of 2.6 cN/dtex or more, more preferably a tensile strength of 3.0 cN/dtex or more. A tensile strength of 2.6 cN/dtex or more seldom arises troubles in the processing steps besides having a sufficient strength in the final product by excluding practical problems.

The elongation is preferably 40.0% or less, more preferably 35.0% or less, from the practical point of view.

The flat yarn thus obtained is excellent in productivity, and has good thermal contraction characteristics and tensile strength suitable for practical uses as well as stability in processing.

The linear density of the flat yarn is usually in the range of 330 to 1100 dtex when the yarn has a width of 3 to 6 mm, and 560 to 3,300 dtex when the yarn has a width of 6 to 12 mm.

The flat yarn according to the present invention may be processed in to woven and knit fabrics for use by the process known in the art.

EXAMPLES

The present invention will be described hereinafter with reference to examples, measurements of physical and chemical properties are as follows. The properties not described below was measured by the process as hitherto described.

(Rate of Decrease of Viscosity During Melt-Extrusion)

The relative viscosity ($\eta$rel) of the film shaped sample extruded out of the die was measured to determine the rate of decrease of viscosity by the following equation. The residence time of the molten polymer was about 10 minutes in this example.

Rate of decrease of viscosity during melt-extrusion (%) [(relative viscosity of polymer−relative viscosity of film)/relative viscosity of polymer]×100

EXAMPLE 6-1

Polylactic acid was synthesized by a conventional process using tin octylate as a polymerization catalyst with a starting material ratio of 96.0 mol % of L-lactide and 4.0 mol % of D-lactide.

The polymer obtained had a relative viscosity of 3.7, weight average molecular weight Mw of 195,000, number average molecular weight Mn of 94,000, monomer content of 0.27% by weight or less and Sn content of 17 ppm with a heat stability temperature (5%) of 319° C.

The polymer was melted in a single screw extruder at 190° C., and melt-extruded from a circular die molding apparatus with a diameter of 30 cm and a lip gap of 1.0 mm, followed by solidifying by cooling to form a raw sheet. The raw sheet was slit into 6 mm wide strips, which were drawn on a hot plate followed by anneal drawing with a hot air stream. The first step drawing was performed on a hot plate at a temperature of 115° C. with a draw magnification factor of 5.0, and the second step drawing was performed on a hot plate at a temperature of 120° C. with a draw magnification factor of 1.2, followed by heat-setting at 130° C. in a hot air stream with an annealing ratio of 5%, thereby obtaining a flat yarn with an width of 3 mm and linear density of 560 dtex.

The flat yarn obtained had a contraction ratio of 3.9%, tensile strength of 2.9 cN/dtex and elongation of 33.0%. The rate of decrease of viscosity during melt-extrusion of 4% suggests small amount of decomposition of the polymer during melt-extrusion to substantially arise no troubles in forming the raw sheet. The contraction ratio of 5.0% or less allows contraction by heat-treatment to be hardly generated when the flat yarn is processed into woven and knit fabrics with no changes in feeling, making the fabrics practically favorable. Problems that the textile becomes unusable by the heat-setting temperature were never observed. Since the tensile strength is 2.6 cN/dtex or more, no troubles were encountered in the processing steps to ensure sufficient strength of the final product to exclude practical problems. The elongation of 40.0% or less was practically favorable.

COMPARATIVE EXAMPLE 6-1

Polylactic acid was synthesized by the conventional method using tin octylate as a polymerization catalyst and L-lactide and D-lactide as starting materials, and by adding 0.1 mol % of trimellitic acid as a cross-linking agent. The polymer obtained contained the 95.5 mol % of L-isomer and had a relative viscosity of 3.7, weight average molecular weight Mw of 185,000, number average molecular weight Mn of 92,000, monomer content of 0.18% by weight or less and Sn content of 16 ppm with a heat stability temperature (5%) of 320° C.

The polymer was melted in a single screw extruder at 190° C., and melt-extruded from a circular die extruder with a diameter of 30 cm having a lip gap of 1.0 mm, followed by solidifying by cooling to form a raw sheet. Since the sheet contains cross-linked polylactic acid, many troubles were seen in forming the raw sheet with poor melt-extrusion ability. The raw sheet was slit into 6 mm wide stripes, which were drawn on a hot plate followed by anneal drawing with a hot air stream. The first step drawing was performed on a hot plate at a temperature of 118° C. with a draw magnification factor of 5.0, and the second step drawing was performed on a hot plate at a temperature of 120° C. with a draw magnification factor of 1.2, followed by heat-setting at 125° C. in a hot air stream with an annealing ratio of 5%, thereby obtaining a flat yarn with an width of 3 mm and linear density of 560 dtex. Troubles during drawing the flat yarn was often seen due to the presence of cross-linked polylactic acid in the polymer in addition to poor drawing ability.

EXAMPLE 6-2

Polylactic acid was synthesized by the conventional method using tin octylate as a polymerizing catalyst with a starting material ratio of 95.7 mol % of L-lactide and 4.3 mol % of D-lactide.

The polymer obtained had a relative viscosity of 3.3, weight average molecular weight Mw of 174,000, number average molecular weight Mn of 91,000, monomer content of 0.20% by weight or less, and Sn content of 16 ppm with a heat stability temperature (5%) of 319° C.

The polymer was melted in a single screw extruder at 190° C., and melt-extruded from a circular die extruder having a diameter of 30 cm with a lip gap of 1.0 mm, followed by solidification by cooling to form a raw sheet. This sheet was slit into 6 mm wide stripes, which were drawn on a hot plate followed by annealing heat-treatment in a hot air stream. The first step drawing was performed on a hot plate at a temperature of 115° C. with a draw magnification factor of 5.5, and the second step drawing was performed on a hot plate at a temperature of 120° C. with a draw magnification factor of 1.2, followed by heat-setting at 130° C. in a hot air stream with an annealing ratio of 5%, thereby obtaining a flat yarn with an width of 3 mm and linear density of 890 dtex.

The flat yarn obtained had a contraction ratio of 4.3%, tensile strength of 2.7 cN/dtex and elongation of 36.0%. The rate of decrease of viscosity during melt-extrusion of 4% suggests a small amount of decomposition of the polymer to avoid troubles in forming the raw sheet. The contraction ratio of 5.0% or less hardly generates contraction by heat-treatment when the yarn is processed into woven and knit fabrics with no changes of feeling, which is suitable for practical application. Problems that the fabric becomes unusable by the heat-setting temperature were also avoided. The tensile strength of 2.6 cN/dtex or more hardly arises troubles in the processing steps to make the strength of the final product sufficient without any practical problems. The elongation of 40.0% or less was practically favorable.

EXAMPLE 6-3

Polylactic aid was synthesized by the conventional method using tin octylate as a polymerizing catalyst with a starting material ratio of 98.5 mol % of L-lactide and 1.5 mol % of D-lactide.

The polymer obtained had a relative viscosity of 4.2, weight average molecular weight Mw of 201,000, number average molecular weight Mn of 103,000, monomer content of 0.20% by weight or less and Sn content of 16 ppm with a heat stability temperature (5%) of 319° C.

The polymer was melted in a single screw extruder at 190° C., and melt-extruded from a circular die extruder having a diameter of 30 cm with a lip gap of 1.0 mm, followed by solidification by cooling to form a raw sheet. This sheet was slit into 6 mm wide stripes, which were drawn on a hot plate followed by annealing heat-treatment in a hot air stream. The first step drawing was performed on a hot plate at a temperature of 118° C. with a draw magnification factor of 5.5, and the second step drawing was performed on a hot plate at a temperature of 120° C. with a draw magnification factor of 1.2, followed by heat-setting at 130° C. in a hot air stream with an annealing ratio of 5%, thereby obtaining a flat yarn with an width of 3 mm and linear density of 890 dtex.

The flat yarn obtained had a contraction ratio of 1.9%, tensile strength of 3.4 cN/dtex and elongation of 30.0%. The rate of decrease of viscosity during melt-extrusion of 4% suggests a small amount of decomposition of the polymer to avoid troubles in forming the raw sheet.

The contraction ratio of 5.0% or less hardly generates contraction by heat-treatment when the yarn is processed into woven and knit fabrics with no changes of feeling, which is suitable for practical application. Problems that the fabric becomes unusable by the heat-setting temperature were also avoided. The tensile strength of 2.6 cN/dtex or more hardly arises troubles in the processing steps to make the strength of the final product sufficient without any practical problems. The elongation of 40.0% or less was practically favorable.

(False-Twist Yarn and Producing Process Thereof)

The false-twist yarn and producing process thereof will be described hereinafter.

A long term operation is difficult in the false-twist yarn manufactured from a biodegradable resin currently known in the art because break of yarns during processing frequently happens. Moreover, the tensile strength and expansion-contraction recovery ratio are so low that crimp characteristics required for the false-twist yarn is extremely poor. It is also a problem that a high quality fabric cannot be constantly supplied due to frequently occurring break of yarns and fluffs in the post processing such as weave and knit processing.

The inventors of the present invention have invented false-twist yarns excellent in work efficiency and properties by using polylactic acid having selected properties through intensive studies of the properties of polylactic acid as a starting material of the false-twist yarn. The object of the present invention is to provide a practically applicable false-twist yarn comprising polylactic acid with excellent work efficiency, wherein the polylactic acid fiber is capable of processing into a twist yarn, wherein the polylactic acid twist yarn is free from break of yarns and filament with excellent characteristics as textiles, and wherein the twist yarn has physical properties such as tensile strength and expansion/contraction recovery ratio comparative to those of conventional polyester twist yarns, and is to provide the processes for producing thereof.

The false-twist yarn according to the present invention satisfies the following features.

In a first aspect, the present invention provides a false-twist yarn mainly comprising a polylactic acid resin, wherein the monomer content in the polylactic acid is 0.5% by weight or less.

In a second aspect according to the more preferred embodiment of the first aspect, the polylactic acid false-twist yarn comprises 95 mol % or more of the L-isomer of the polylactic acid resin.

In a more preferable third aspect, the polylactic acid false-twist yarn according to the first and second aspects comprises a linear polylactic acid resin.

In a further preferable fourth aspect, the polylactic acid false-twist yarn according to the first to third aspects comprises the polylactic acid resin with ηrel of 2.7 to 3.9.

In a more preferable fifth aspect, the polylactic acid false-twist yarn according to the first to fourth aspect comprises the polylactic acid resin with an Sn content of 0 or 30 ppm or less.

In a more preferable sixth aspect, the polylactic acid false-twist yarn according to the first to fifth aspects has a tensile strength of 2.4 cN/dtex or more.

In a more preferable seventh aspect, the polylactic acid false twist yarn according to the first to sixth aspects has a expansion/contraction recovery ratio of 10% or more.

In the process for producing the polylactic acid false-twist yarn as described above, a polylactic acid non-drawn yarn is subjected to a simultaneous draw and false-twist processing at a draw temperature of 110° C. or more and draw magnification factor of 1.3 to 1.8, wherein the polylactic acid resin according to the first to fifth aspects has birefringence Δn of 0.010 to 0.035, the tensile strength S (cN/dtex) and ultimate elongation E (%) is represented by the relation of $15 \leq S \times \sqrt{E} \leq 23$.

The monomer content in polylactic acid according to the present invention is required to be 0 or 0.5% by weight or less. Monomers as determined in the present invention refers to the component having a molecular weight of 1,000 or less as determined by a GPC assay. Yarns are liable to be fragile and the twisted yarn suffers extreme stress when the monomer content exceeds 0.5% by weight, thereby the tensile strength is markedly decreases. Throughput of twist works turn out to be unstable due to frequent break of yarns during the process by the same reason as described above.

Usually, the reaction vessel is evacuated immediately before completing the polymerization reaction for removing unreacted monomers in the polylactic acid. Otherwise, polymerized chips may be washed with an appropriate solvent, or subjected to a solid state polymerization.

Lactic acid according to the present invention comprises naturally occurring L-lactic acid and D-lactic acid as an optical isomer of L-lactic acid, L-lactide and D-lactide as dimers thereof, and mesolactide. The proportion of L-isomer is preferably 95 mol % or more, more preferably 98 mol % or more.

When the proportion of the L-isomer is 95 mol % or more, the resin becomes highly heat resistant to allow the tensile strength of the yarn to be seldom decreased even by heat-setting at a relatively high temperature. Heat-setting at a high temperature makes expansion/contraction recovery ratio of the yarn to be excellent to enable a false-twist yarn with excellent crimp characteristics to be obtained.

The polylactic acid is preferably a linear polymer, or substantially has no branched structure. Adding a branching agent in the polymerization process of polylactic acid has been proposed for improving melt viscosity and degree of polymerization. However, it was confirmed by the inventors of the present invention that the branched structure of the polylactic acid composition far more negatively affects properties of the false-twist yarn and work efficiency of the yarn as compared with conventional polyesters. In other words, the multifilament comprising polylactic acid having no branched structure seldom arises break of yarns during false-twisting, and the false-twist yarn obtained therefrom has a higher tensile strength than the false-twist yarn having some branched structure.

For excluding the branched structure, it is recommended to avoid use of agents that arise the branched structure, for example three valent or four valent alcohols and carboxylic acids, in the polymer material. However, when these chemicals are forced to use for some other reasons, the amount of use should be restricted within a range as small as possible so that false-twist efficiency is not adversely affected.

Polylactic acid according to the present invention preferably has a relative viscosity (ηrel) of 2.7 to 3.9, because an excellent false-twist yarn may be obtained, or decrease of the tensile strength is suppressed to be minimum to decrease break of yarns during the false-twist process in this viscosity range.

The Sn content in polylactic acid according to the present invention is preferably 0 or 30 ppm or less. While the Sn based catalyst is used as a polymerization catalyst of polylactic acid, an Sn content of 30 ppm or less permits decrease of the tensile strength to be suppressed to its minimum besides decreasing the incidence of break of yarns in the false-twist process.

Although polylactic acid without the properties as described above or common resins other than polylactic acid may be used as starting materials in the false-twist yarn according to the present invention, the material is preferably a biodegradable resin such as an aliphatic polyester for manufacturing a biodegradable false-twist yarn.

The false-twist yarn preferably has a tensile strength of 2.5 cN/dtex or more, because incidence of break of yarns and fluffs decrease in the post-processing such as weave and knit process when the tensile strength falls within the range above.

The false-twist yarn according to the present invention preferably has a contraction ratio in boiling water of 5% or more from the view point of preventing wrinkles from generating. The contraction ratio in boiling water of 5% or more can prevent wrinkles from generating when fabrics are subjected to dyeing process.

The contraction ratio in boiling water is preferably 15% or less when the strength of the yarn is emphasized. The tensile strength and tear strength may be secured without largely changing dimensions and mass per unit area of the fabric when contraction ratio in boiling water is 15% or less.

A contraction ratio in boiling water of 5 to 15% is preferable for satisfying both prevention of wrinkles and retention of strength.

The false-twist yarn according to the present invention preferably has a expansion/contraction recovery ratio of 10% or more, because the fabric is endowed with flexibility to enable the yarns to be developed in the application fields in which stretching properties are required. Moreover crimp characteristics of the false-twist yarn permits fabrics having a fluffy feeling to be supplied.

Commonly available false-twisting machines may be used for false-twist of the raw thread of the false-twist yarn comprising threads of polylactic acid. While the false-twisting machine is classified into a cross-belt type having a twist-rotor comprising a rubber based material, a pin-type having a twist-rotor comprising a metal, and a friction type for twisting with a disk, the type of the machine is not particularly restricted.

The temperature of the plate heater for heat-setting is preferably 110 to 150° C., more preferably 120 to 140° C. Since the melting point of polylactic acid is 170° C., molecular orientation is not disturbed at 150° C. or less to enable the tensile strength to be avoided from largely decreased. A sufficient heat-setting is possible, on the other hand, at 110° C. or more to make the expansion/contraction ratio to be high to enable a false-twist yarn having excellent crimp characteristics to be obtained.

EXAMPLES

The present invention will be described in detail with reference to examples. While analysis processes of the physical and chemical properties of the polymer are described herein, those not described below have been already described.

(Tensile Strength)

A load was applied to the sample by hanging a (indicated linear density×$\frac{1}{10}$) grams of weight. The sample with a length of 20 cm was drawn at a speed of 20 cm/min using a Tensiron type tensile strength tester, and the tensile strength was calculated from the break force using the following equation:

tensile strength (cN/dtex)=break force/actual linear density (Ultimate Elongation)

A load was applied to the sample by hanging a (indicated linear density×$\frac{1}{10}$) grams of weight. The sample with a chuck distance of 50 cm was drawn at a speed of 50 cm/min using an Instron type tensile strength tester to measure the chuck distance (L) when the sample is broken, and the ultimate elongation was calculated from the following equation:

Ultimate elongation (%)=(L−50)/50×100

(Contraction Ratio in Boiling Water)

A load was applied to the sample by hanging a (indicated linear density×$\frac{1}{10}$) grams of weight using a round scale with a frame circumference of 100 cm. A sub-reel with a reel number of ten was manufactured, and the sample was immersed in water at room temperature by loading with an (indicated linear density×$\frac{1}{10}$×20) grams weight to measure the length of the sample eight minutes after immersion. The sample was then taken out of water, folded twice as a figure of 8 and immersed in boiling water for 80 minutes. The sample was again loaded with an (indicated linear density×$\frac{1}{10}$×20) grams weight in water to measure the length eight minutes after immersion. The contraction ratio in boiling water was calculated by the following equation:

Contraction ratio in boiling water (%)=[(initial sample length−sample length after contraction)/initial sample length]×100

(Expansion/Contraction Recovery Ratio)

A load was applied to the sample by hanging a (indicated linear density×$\frac{1}{10}$) grams of weight. A sub-reel with a reel number of ten was manufactured, and the sample was immersed in water at 20±2° C. for 3 minutes by loading with an (indicated linear density×$\frac{1}{10}$×20) grams weight. The length (a) of the reel was at first measured and, after allowing to stand for two minutes by removing the load, the length (b) of the reel was measured again to calculate the recovery ratio from the following equation:

Expansion/contraction recovery ratio (%)=(a−b)/a×100

(Work Efficiency of False-Twist)

Work efficiency of false-twist was totally evaluated by the following criteria:

⊚: incidence of break of yarns is one time/day or less among 48 spindles;

o: incidence of break of yarns is two to five times/day among 48 spindles;

: incidence of break of yarns is six to 15 times/day among 48 spindles; and x: incidence of break of yarns is 16 times/day or more among 48 spindles.

(Work Efficiency of Weaving)

Work efficiency of weaving when the yarn was woven using WJL was totally evaluated by the following criteria:

⊚: incidence of break of yarns is zero time a day;

o: incidence of break of yarns is one to two times a day;

: incidence of break of yarns is three to nine times a day; and x: incidence of break of yarns is ten times or more a day.

(Feeling of Textile)

Feeling of textile was totally evaluated by the following criteria:

⊚: fluffy feeling of the textile is nearly identical to the textile using regular polyester yarns;

o: fluffy feeling of the textile is somewhat inferior to the textile using regular polyester yarns;

: the textile using the false-twist yarn has somewhat better fluffy feeling than the textile using the original yarn; and x: there is no fluffy feeling at all.

EXAMPLE 7-1

A false-twist yarn with a tensile strength of 3.2 cN/dtex and expansion/contract recovery ratio of 16.4% was obtained from the polylactic acid fibers having the composition shown in Table 7-1 by heat-setting at 130° C. using a false-twisting machine 33H-Mach Crimper (made by Murata Machine Co.) comprising a cross-belt type twist roller. Work efficiency of the yarn was favorable, and no break of yarns was observed after processing of 1 ton of yarns. When a textile was woven with a water-jet loom using this false-twist warn as a woof, fabrics having sufficient fluffy feeling can be manufactured with substantially no break of yarns.

EXAMPLE 7-2

A false-twist yarn with a tensile strength of 2.9 cN/dtex and expansion/contract recovery ratio of 14.8% was obtained from the polylactic acid fibers having the composition shown in Table 7-1 by heat-setting at 130° C. using a false-twisting machine ST-5 (made by Mitsubishi Industrial Machine Co.) comprising a pin type twist roller. Work efficiency of the yarn relatively was favorable, and no break of yarns was observed after processing of 1 ton TV of yarns. When a textile was woven with a water-jet loom using this false-twist warn as a woof, fabrics having sufficient fluffy feeling can be manufactured with substantially no break of yarns.

COMPARATIVE EXAMPLE 7-1

A false-twist yarn with a tensile strength of 1.9 cN/dtex and expansion/contract recovery ratio of 13.3% was obtained from the polylactic acid fibers containing a large proportion of monomers using a false-twisting machine 33H-Mach Crimper (made by Murata Machine Co.) comprising a cross-belt type twist roller. The tensile strength was low due to large content of the monomer, and work efficiency was considerably poor with frequent occurrence of break of yarns when a textile was woven using this false-twist yarn as a woof with a water-jet loom.

EXAMPLE 7-3

A false-twist yarn with a tensile strength of 1.2 cN/dtex and expansion/contraction recovery ratio of 6.7% was obtained from a polylactic acid fiber containing a small proportion of the L-isomer as shown in Table 7-1 using the false-twisting machine used in Comparative Example 7-1. The false-twist yarn had a little higher contraction ratio in boiling water and a little low work efficiency. However, break of yarns was seldom observed when a fabric was woof using this false-twist yarn as a woof with a water-jet loom.

EXAMPLE 7-4

A false-twist yarn with a tensile strength of 2.2 cN/dtex and expansion/contraction recovery ratio of 13.1% was obtained from a polylactic acid fiber containing branched structures as shown in Table 7-1 using the false-twisting machine used in Comparative Example 7-1. Although work efficiency was a little poor with a few times of break of yarns since the tensile strength is inferior to the yarns having no branched structure in Example 7-1, the expansion/contraction recovery ratio was as high as 10% or more. When a fabric was woven using this false-twist yarn as a woof with a water-jet weave machine, a fluffy fabric could be manufactured with few frequency of break of yarns.

EXAMPLE 7-5

A false-twist yarn with a tensile strength of 1.6 cN/dtex and expansion/contraction recovery ratio of 14.5% was obtained from a polylactic acid fiber having a low relative viscosity as shown in Table 7-1 using the false-twisting machine used in Comparative Example 7-1. Although work efficiency was a little poor with a few times of break of yarns due to a little inferior tensile strength of this false-twist yarn to the false-twist yarn having a favorable relative viscosity in Example 7-1, the contraction rate in boiling water was low and expansion/contraction recovery ratio was high. When a fabric was woven using this false-twist yarn as a woof with a water-jet loom, a fluffy fabric could be manufactured with few frequency of break of yarns.

EXAMPLE 7-6

A false-twist yarn with a tensile strength of 2.3 cN/dtex and expansion/contraction recovery ratio of 13.3% was obtained from a polylactic acid fiber having a high relative viscosity as shown in Table 7-1 using the false-twisting machine used in Comparative Example 7-1. Although work efficiency was a little poor with a few times of break of yarns due to a little inferior tensile strength of this false-twist yarn to the false-twist yarn having a favorable relative viscosity in Example 7-1, the contraction rate in boiling water was low and expansion/contraction recovery ratio was high. When a fabric was woven using this false-twist yarn as a woof with a water-jet loom, a fluffy fabric could be manufactured with few frequency of break of yarns.

EXAMPLE 7-7

A false-twist yarn with a tensile strength of 1.3 cN/dtex and expansion/contraction recovery ratio of 12.8% was obtained from a polylactic acid fiber containing a large amount of Sn as shown in Table 7-1 using the false-twisting machine used in Comparative Example 7-1. Although work efficiency was a little poor with a few times of break of yarns due to a low tensile strength of this false-twist yarn as compared with the false-twist yarn containing a small amount of Sn in Example 7-1, the contraction rate in boiling water was low and expansion/contraction recovery ratio was high. When a fabric was woven using this false-twist yarn as a woof with a water-jet loom, a fluffy fabric could be manufactured with few frequency of break of yarns.

TABLE 7-1

| No. 7- | Example 1 | Example 2 | Comparative Example 1 | Example 3 | Example 4 | Example 5 | Example 6 | Example 7 |
|---|---|---|---|---|---|---|---|---|
| Sn Content (ppm) | 16 | 16 | 18 | 21 | 19 | 16 | 15 | 62 |
| Relative Viscosity of Polymer ($\eta$rel) | 3.05 | 3.05 | 2.92 | 3.05 | 3.04 | 2.05 | 4.02 | 2.94 |
| Monomer Content (% by weight) | 0.24 | 0.24 | 1.02 | 0.27 | 0.26 | 0.25 | 0.24 | 0.24 |
| Branched Structure | Non | Non | Non | Non | Yes | Non | Non | Non |
| L-isomer (mol %) | 98.6 | 98.6 | 98.2 | 92.6 | 99.0 | 97.6 | 97.0 | 95.5 |
| twist roller | cross-belt | pin | cross-belt | cross-belt | cross-belt | cross-belt | cross-belt | cross-belt |
| plate heater temperature (° C.) | 130 | 130 | 130 | 130 | 130 | 130 | 130 | 130 |
| tensile strength (cN/dtex) | 3.17 | 2.91 | 1.85 | 1.23 | 2.20 | 1.59 | 2.29 | 1.32 |
| ultimate elongation (%) | 26.7 | 27.2 | 26.4 | 22.2 | 28.7 | 24.2 | 27.4 | 25.0 |
| expansion/contraction recovery ratio (%) | 16.4 | 14.8 | 13.3 | 6.7 | 13.1 | 14.5 | 13.3 | 12.8 |
| contraction ratio in boiling water (%) | 10.8 | 9.8 | 10.3 | 25.1 | 10.4 | 10.1 | 12.3 | 11.6 |
| work efficiency of false-twist | ◎ | ○ | × | | | | | |
| work efficiency of weaving | ◎ | ◎ | × | ○ | ○ | ○ | ○ | ○ |
| feeling of fabric | ◎ | ◎ | ○ | ○ | ○ | ○ | ○ | ○ |

The producing process according to the present invention will be described hereinafter.

A highly oriented non-drawn polylactic acid fiber with a birefringence (Δn) of 0.010 to 0.035, and tensile strength S (cN/dtex) and ultimate elongation (%) in the range of the following equation should be used for the false-twist yarn according to the present invention.

$$15 \leq S \times \sqrt{E} \leq 23$$

Since the polylactic acid fiber is inferior in heat resistance to other synthetic fibers, at draw and twist processing filaments are melt-fused in the polylactic acid non-drawn yarn with a birefringence (Δn) of less than 0.010 and $S \times \sqrt{E}$ of less than 15 to make processing unstable. In the polylactic acid highly oriented non-drawn yarn with a birefringence (Δn) of exceeding 0.035 and $S \times \sqrt{E}$ of exceeding 23, yarns having desirable properties cannot be obtained due to too high orientation.

The heater temperature for simultaneous draw-and-twist processing is required to be 110° C. or more. A temperature of less than 110° C. fails in obtaining a false-twist yarn having sufficient properties.

The draw magnification factor in the simultaneous draw-and-twist processing should be 1.3 to 1.8. Satisfactory properties cannot be obtained at a factor of less than 1.3, while a factor of exceeding 1.8 arises break of yarns to fail in practical production.

While other polymers may be used together, a biodegradable polymer material should be used for manufacturing a biodegradable false-twist yarn.

EXAMPLES

Polymerization of Polymer

Polylactic acid was synthesized by the conventional process using L-lactide and D-lactide as starting materials and tin octylate as a polymerization catalyst. For comparison, polylactic acid was also synthesized by adding 0.1 mol % of trimellitic acid as a cross-link agent. The polymer obtained was further subjected to solid sate polymerization at 135° C. to reduce the content of residual monomers. However, solid state polymerization was omitted in a part of the samples for comparative purposes.

EXAMPLES 8-1 TO 8-4, COMPARATIVE EXAMPLES 8-1 TO 8-10

Each polylactic acid was melted at a predetermined temperature and spun from nozzle holes with a diameter of 0.3 mm. After reeling at a spinning speed of 3800 m/min, the filaments were simultaneously drawn and false-twisted to produce a false-twist yarn with a linear density of 84 dtex/24f. The simultaneous draw-and-false twist machine used was 33H mach Crimper made by Murata Machine Co.

As shown in the date of the examples in Tables 8-1 to 8-4, the false-twist yarns produced under the conditions according to the present invention had splendid properties. On the contrary, as shown in the comparative examples 8-1 to 8-7, the false twist yarns having sufficient properties could not obtained from the non-drawn yarns with Δn, S and E out of the range of the present invention.

TABLE 8-1

| | | Comparative Example | | | Example | |
|---|---|---|---|---|---|---|
| No.8- | | 1 | 2 | 3 | 1 | 2 |
| Sn Content (ppm) | | 18 | 19 | 62 | 26 | 17 |
| Relative Viscosity of Polymer (ηrel) | | 2.92 | 3.02 | 2.94 | 2.93 | 2.98 |
| Monomer Content (% by weight) | | 3.46 | 0.98 | 0.24 | 0.26 | 0.25 |
| Branched structure | | Non | Non | Non | Non | Non |
| L-isomer (mol %) | | 99.0 | 98.5 | 98.7 | 98.7 | 98.6 |
| Spinning Temperature (° C.) | | 230 | 230 | 230 | 230 | 230 |
| Rate of Decrease of Viscosity during spinning (%) | | 20.3 | 10.0 | 17.6 | 5.0 | 3.6 |
| non-drawn yarn | tensile strength (cN/dtex) | 1.55 | 1.87 | 1.76 | 2.07 | 2.12 |
| | ultimate elongation (%) | 62.3 | 60.3 | 61.7 | 61.6 | 59.6 |
| | Δn | 0.007 | 0.008 | 0.009 | 0.013 | 0.015 |
| | $S \times \sqrt{E}$ | 12.2 | 14.5 | 13.8 | 16.2 | 16.4 |
| | fluffs | × | × | × | ○ | ○ |
| false-twist yarn | draw false twist magnification factor | 1.5 | 1.5 | 1.5 | 1.5 | 1.5 |
| | Heater Temperature (° C.) | 130 | 130 | 130 | 130 | 130 |
| | tensile strength (cN/dtex) | 1.76 | 2.02 | 2.04 | 2.67 | 2.68 |
| | contraction ratio in boiling water (%) | 10.6 | 11.2 | 10.8 | 9.8 | 9.8 |
| | expansion/contraction recovery ratio (%) | 10.2 | 11.5 | 11.8 | 13.6 | 14.1 |
| | fluffs | × | × | × | ○ | ○ |

TABLE 8-2

| | Comparative Example | | | | | | |
|---|---|---|---|---|---|---|---|
| No.8- | 4 | 5 | 6 | 7 | 8 | 9 | 10 |
| Sn Content (ppm) | 19 | 18 | 20 | 16.0 | 16.0 | 16.0 | 16.0 |
| Relative Viscosity of Polymer (ηrel) | 3.04 | 2.58 | 4.02 | 3.04 | 3.03 | 3.03 | 3.03 |
| Monomer Content (% by weight) | 0.26 | 0.25 | 0.24 | 0.26 | 0.26 | 0.26 | 0.26 |
| Branched structure | Yes | Non | Non | Non | Non | Non | Non |
| L-isomer (mol %) | 99.0 | 98.7 | 99.0 | 94.7 | 98.9 | 98.9 | 98.9 |
| Spinning Temperature (° C.) | 230 | 230 | 245 | 230 | 230 | 230 | 230 |

TABLE 8-2-continued

|  | Comparative Example | | | | | | |
| No.8- | 4 | 5 | 6 | 7 | 8 | 9 | 10 |
|---|---|---|---|---|---|---|---|
| Rate of Decrease of Viscosity during spinning (%) | 6.0 | 8.0 | 15.0 | 5.0 | 4.0 | 4.0 | 4.0 |
| non-drawn yarn tensile strength (cN/dtex) | 1.89 | 1.76 | 1.88 | 1.88 | 2.26 | 2.26 | 2.26 |
| ultimate elongation (%) | 59.0 | 60.0 | 61.0 | 58.0 | 59.7 | 59.7 | 59.7 |
| $\Delta n$ | 0.009 | 0.008 | 0.008 | 0.008 | 0.017 | 0.017 | 0.017 |
| $S \times \sqrt{E}$ | 14.5 | 13.6 | 14.6 | 14.3 | 17.4 | 17.4 | 17.4 |
| fluffs | ○ | × | × | ○ | ○ | ○ | ○ |
| draw false twist magnification factor | 1.5 | 1.5 | 1.5 | 1.5 | 1.2 | 1.5 | 2.0 |
| Heater Temperature (° C.) | 130 | 130 | 130 | 130 | 130 | 105 | 130 |
| false-twist yarn tensile strength (cN/dtex) | 2.06 | 1.92 | 1.96 | 2.24 | 2.29 | 2.28 | 2.20 |
| contraction ratio in boiling water (%) | 10.6 | 9.8 | 9.8 | 20.4 | 9.8 | 13.6 | 9.6 |
| expansion/contraction recovery ratio (%) | 10.6 | 13.0 | 13.4 | 14.4 | 12.4 | 8.4 | 12.4 |
| fluffs | ○ | × | × | ○ | ○ | ○ | ○ |

TABLE 8-3

|  | Example | |
| No. 8- | 3 | 4 |
|---|---|---|
| Sn Content (ppm) | 16 | 15 |
| Relative Viscosity of Polymer ($\eta$rel) | 3.05 | 2.94 |
| Monomer Content (% by weight) | 0.15 | 0.13 |
| Branched structure | Yes | Yes |
| L-isomer (mol %) | 99.0 | 98.7 |
| Spinning Temperature (° C.) | 230 | 230 |
| non-drawn yarn Rate of Decrease of Viscosity during spinning (%) (%) | 5.2 | 5.0 |
| tensile strength (cN/dtex) | 2.24 | 2.29 |
| ultimate elongation (%) | 58.9 | 60.0 |
| $\Delta n$ | 0.025 | 0.024 |
| $S \times \sqrt{E}$ | 17.2 | 17.7 |
| fluffs | ○ | ○ |
| draw false twist magnification factor | 1.5 | 1.5 |
| Heater Temperature (° C.) | 130 | 130 |
| false-twist yarn tensile strength (cN/dtex) | 2.69 | 2.63 |
| contraction ratio in boiling water (%) | 10.6 | 10.8 |
| expansion/contraction recovery ratio (%) | 15.6 | 14.6 |
| fluffs | ○ | ○ |

(Filament Nonwoven Fabric)

Finally, the filament nonwoven fabric according to the present invention will be described below.

The polylactic acid filament nonwoven fabric known in the art include a filament nonwoven fabric having no core-and-sheath structure in which a polymer prepared by cross-linking a polybutylene succinate polymer synthesized from 1,4-butanediol and succinic acid with urethane bonds is blended with polylactic acid as a binder resin. However, this polymer composition has so poor compatibility that a filament nonwoven fabric having a sufficient tensile strength cannot be obtained.

The inventors of the present invention have strictly surveyed the properties of the polylactic acid as a starting material of the textile, and invented a polylactic acid filament nonwoven fabric having physical properties such as tensile strength and expansion ratio comparable to those of polyester, nylon and polypropylene fibers, by using polylactic acid with selected properties and having a core-and-sheath structure.

In a first aspect, the present invention provides a polylactic acid filament nonwoven fabric mainly comprising polylactic acid (PLA) and having a core-and-sheath structure, wherein the core to sheath ratio is 1:1 to 5:1 in area ratio, and the sheath component comprises polylactic acid having a lower melting point than the core component, or the sheath component comprises a blend of polylactic acid and other biodegradable polymers having a lower melting point than polylactic acid.

In a second aspect, the present invention provides a filament nonwoven fabric having a core-and-sheath structure, wherein (a) the core component has a linear structure with a relative viscosity of 2.5 to 3.5 and Sn content of 0 or 30 ppm or less, and polylactic acid contains 98 mol % or more of the L-isomer, and (b) the sheath component has a linear structure with a relative viscosity of 2.5 to 3.5 and Sn content of 0 or 30 ppm or less, and comprises polylactic acid with 96 mol % or less of the L-isomer and the core to sheath ratio of 1:1 to 5:1 in area ratio.

In a third aspect, the present invention provides a filament nonwoven fabric having a core-and-sheath structure, wherein (a) the core component has a linear structure with a relative viscosity of 2.5 to 3.5 and Sn content of 0 or 30 ppm or less, and polylactic acid contains 98 mol % or more of the L-isomer, and (b) the sheath component has a linear structure with a relative viscosity of 2.5 to 3.5 and Sn content of 0 or 30 ppm or less, and comprises a blend of polylactic acid with 98 mol % or more of the L-isomer and a polymer prepared by cross-linking a polybutylene succinate polymer synthesized from 1,4-butanediol and succinic acid with urethane bonds, the weight ratio of polylactic acid being 50 to 90% and the core to sheath ratio being 1:1 to 5:1 in area ratio.

In a more preferable embodiment of the present invention, the polylactic acid filament nonwoven fabric has a mean linear density of 1 to 15 dtex, mass per unit area of 10 to 200 g/m² and tensile strength in the longitudinal direction of 30N or more.

The first aspect according to the present invention will be described first. In this aspect, polylactic acid is used for the core, and polylactic acid having a lower melting point than the core component or a blend of a biodegradable polymer having a lower melting point than the polylactic acid with polylactic acid is used for the sheath component. The core to sheath ratio is 1:1 to 5:1 in area ratio.

Forming the core-and-sheath structure allows polylactic acid crystal as the core component to be fully oriented, and using polylactic acid having a lower melting point than the core component or a blend of a biodegradable polymer having a lower melting point than the polylactic acid with polylactic acid gives an advantage that filaments are partially fused with each other so that a sufficiently high tensile strength is obtained.

The core-and-sheath fiber according to the present invention is required to have a core to sheath ratio of 1:1 to 5:1. The proportion of the sheath component higher than this range is inadequate, since the tensile strength may become insufficient and the fiber may adhere to the hot roller to decrease work efficiency. The proportion of the core component higher than this range is also inadequate, since the tensile strength may decrease due to insufficient partial fusion among the filaments or fluffs may appear in the filament nonwoven fabric.

The second aspect of the present invention will be described hereinafter. The polylactic acid to be used in the present invention has a linear structure, or substantially has no branched structure. It has been proposed to add a small amount of a branching agent in preparing polylactic acid in order to improve melt viscosity and degree of polymerization. However, it was confirmed by the inventors of the present invention that the branched structure of the polylactic acid composition far more negatively affects work efficiency of spinning as compared with conventional polyesters. In other words, even a small proportion of the branched structure in polylactic acid reduces the tensile strength as compared with polylactic acid having no branched structure.

For excluding the branched structure, it is recommended to avoid use of agents that arise the branched structure, for example three valent or four valent alcohols and carboxylic acids, in the polymer material. However, when such agent is forced to use for some reasons, the amount should be restricted within a minimum essential range that does not affect work efficiency of spinning such as break of fibers during spinning.

The Sn content in polylactic acid to be used in the present invention is 30 ppm or less, preferably 0 or 20 ppm or less. While the Sn based catalyst is used as the polymerization catalyst of polylactic acid, Sn content exceeding 30 ppm induces depolymerization during spinning to extremely reduce work efficiency of spinning.

For reducing the Sn content, the amount of Sn to be used for polymerization may be reduced, or the polymerized chips are washed with an appropriate solvent.

The polylactic acid to be used in the present invention has a relative viscosity ($\eta$rel) of 2.7 to 3.9. A viscosity lower than this range reduces heat resistance of the polymer to make it impossible to attain a sufficient tensile strength, while the higher viscosity forces the spinning temperature to be elevated to cause heat degradation during spinning. Therefore, the preferable range is 2.7 to 3.0.

While polylactic acid to be used for the core component mainly comprises L-lactic acid or D-lactic acid, L-lactide or D-lactide as a dimer of lactic acid, or mesolactide, it is crucial that the proportion of the L-isomer is 98 mol % or more. When the proportion of the L-isomer is lower than 98 mol % crystal orientation during the producing process is inhibited from advancing to deteriorate the physical properties of the fibers obtained. The tensile strength is particularly reduced to make the fibers practically inapplicable.

Polylactic acid to be used in the sheath component has a proportion of the L-isomer of 96 mol % or less in order to allow the sheath part to have a different melting point from the melting point of the core part. The preferable proportion of the L-isomer is 91 to 95 mol %.

A polymer in which 10 to 50% by weight of a polymer, prepared by cross-linking a polybutylene succinate polymer synthesized from 1,4-butanediol and succinic acid with urethane bonds and having a lower melting point than L-lactic acid to be used for the core part, is blended with polylactic acid is preferably used for endowing the sheath part with fusing property. A blend ratio of exceeding 50% makes fusing property among the filaments too high to make the nonwoven fabric to adhere on the hot roller, thereby making work efficiency and productivity insufficient.

Various additives such as a lubricants, an oxidation stabilizer and heat stabilizer may be added, if necessary, to the polymer to be used in the present invention in the range not compromising the effect of the present invention.

It is essential that the core-to-sheath ratio is in the range of 1:1 to 5:1 in area ratio. A larger proportion of the sheath component than this range is inappropriate, since the tensile strength may become insufficient or the filament nonwoven fabric may fuse the hot roller to reduce work efficiency. A larger proportion of the core component is also inappropriate, because filaments are not partially fused with each other to reduce the tensile strength, or fluffs may appear in the filament nonwoven fabric.

The filament nonwoven fabric according to the present invention preferably has a mean linear density of 1 to 15 dtex. When the linear density exceeds 15 dtex, cooling performance may be poor during producing, or flexibility of the filament nonwoven fabric may be compromised, thereby arising practical problems. The linear density of less than 1 dtex may reduce productivity due to frequent occurrence of break of fibers.

The third aspect of the present invention will be described hereinafter. The same quality of polylactic acid as used in the second aspect of the present invention should be used in this aspect.

The polymer for blend to be used in the sheath component according to the present invention is a polymer prepared by cross-linking polybutylene succinate polymer synthesized from 1,4-butanediol and succinic acid with urethane bonds.

For blending the polymer with polylactic acid to form a sheath component, the required blending ratio of polylactic acid is 50 to 90% by weight. When the proportion of polylactic acid is less than 50% by weight, filaments are too strongly fused with each other to form a sheet, or the filament nonwoven fabric is fused on the hot roller to reduce productivity. When the proportion of polylactic acid exceeds 90% by weight, on the other hand, fluffs may appear due to insufficient fusion among the filaments with a low tensile strength to make the fabric to be practically inapplicable.

The required core-to-sheath ratio in the present invention is 1:1 to 5:1 in area ratio. A larger proportion of the sheath component than this range is not appropriate, since the tensile strength may become insufficient or the filament nonwoven fabric may fuse the hot roller to reduce work efficiency. A larger proportion of the core component is also inappropriate since partial fusion among the filaments is not so sufficient that the tensile strength becomes insufficient, or fluffs may appear in the filament nonwoven fabric.

The filament nonwoven fabrics according to the three aspects of the present invention as described above preferably have a mean linear density of 1 to 15 dtex, mass per unit area of 10 to 200 g/m$^2$ and longitudinal tensile strength of 30N or more. A linear density in this range permits sufficient productivity to be obtained. A mass per unit area in this range makes the fabric flexible, while a longitudinal tensile strength in this range arises no troubles in respective processing steps.

The producing process of the filament nonwoven fabric comprises the steps of, for example, dispersing the filaments while drawing by reeling them at a reel speed of 3,000 m/min to 6,000 m/min, collecting and piling the filaments on a moving support made of a capture wire nets, and partially fusing the filaments on a roll at a roll temperature of 100 to 150° C. to obtain a filament nonwoven fabric.

The reel speed in this is preferable since crystal orientation sufficiently advances to enhance work efficiency.

The roll temperature is preferably 100 to 150° C. A temperature of higher than 150° C. is too close to the melting point of polylactic acid of the core component that the nonwoven fabric fuses on the roller to arise problems in productivity.

EXAMPLES

The present invention will be described in more detail hereinafter with reference to examples. The analysis method of physical and chemical properties of the polymer will be described first. The method not described herein has been hitherto described.

(Measurement of Elongation Percentage)

A sample piece with a dimension of about 5 cm×20 cm was extracted from a sample. After attaching the sample piece to a tensile strength tester with a chuck distance of 10 cm, the sample piece was drawn at a draw speed of 20 cm/min to measure the load (N) at break of the sample piece.

Spinning work efficiency was measured and evaluated as follows:

(Evaluation of Productivity)
- o: productivity is very excellent with good spinning ability and hot-roll passing performance; and
- x: continuous production is impossible due to poor spinning ability and hot-roll passing performance.

EXAMPLES 9-1 TO 9-3

The filaments were spun at a spinning temperature of 230° C., reeled at a reel speed of 3,000 m/min, and captured and piled on a moving wire capture support in Examples and Comparative Examples. The captured filaments were processed into a filament nonwoven fabric with a mean linear density of 2.2 dtex and mass per unit area of 30 g/m² at a roll temperature of 145° C.

TABLE 9-1

|  | Example | | | Comparative Example | | | |
|---|---|---|---|---|---|---|---|
| No. 9- | 1 | 2 | 3 | 1 | 2 | 3 | 4 |
| core-to-sheath area ratio | 1:1 | 2:1 | 5:1 | 1:1 | 7:1 | 1:3 | 2:1 |
| L-isomer (%) in core PLA | 98.4 | 99.2 | 98.7 | 98.4 | 98.4 | 98.4 | 98.4 |
| core PLA melting point (° C.) | 170 | 172 | 171 | 170 | 170 | 170 | 170 |
| L-isomer (%) in sheath PLA | 94.0 | 92.0 | 94.0 | 97.0 | 93.0 | 93.2 | 92.8 |
| sheath PLA melting point (° C.) | 140 | 128 | 140 | 168 | 135 | 138 | 128 |
| Relative viscosity ηrel | 3.0 | 2.6 | 3.2 | 2.9 | 2.7 | 3.1 | 2.9 |
| content of residual Sn (ppm) | 17 | 20 | 13 | 16 | 21 | 13 | 12 |
| branched structure | Non | Non | Non | Non | Non | Non | Yes |
| longitudinal tensile strength (N) | 77.4 | 87.2 | 94.1 | 26.5 | 29.4 | 18.4 | 25.6 |
| productivity | o | o | o | x | x | x | x |

TABLE 9-2

|  | Comparative Example | | | |
|---|---|---|---|---|
| No. 9- | 5 | 6 | 7 | 8 |
| core-to-sheath area ratio | 2:1 | 1:1 | 1:1 | 1:1 |
| L-isomer (%) in core PLA | 98.3 | 98.6 | 98.6 | 93.8 |
| core PLA melting point (° C.) | 170 | 170 | 171 | 140 |
| L-isomer (%) in sheath PLA | 93.7 | 94.2 | 93.8 | 98.6 |
| sheath PLA melting point (° C.) | 140 | 141 | 140 | 171 |
| Relative viscosity of ηrel | 2.9 | 2.3 | 3.7 | 2.9 |
| content of residual Sn (ppm) | 70 | 17 | 16 | 16 |
| branched structure | Non | Non | Non | Non |
| longitudinal tensile strength (N) | 19.6 | 22.5 | 24.5 | 19.5 |
| productivity | x | x | x | x |

Tables 9-1 and 9-2 show that the filament nonwoven fabric obtained within the conditions of the present invention is excellent in physical properties such as the tensile strength and productivity.

The sample in Comparative Example 9-1 contained a larger proportion of the L-isomer, filaments were not partially fused with each other by hot-rolling, and a lot of fluffs were generated. The sample in Comparative Example 9-2 having a small area ratio of the sheath part was also absent in partial fusion among the filaments, while the sample in Comparative Example 9-3 was, on the contrary, had a too large area ratio of the sheath part that the nonwoven fabric fused on the hot-roll.

The sample in Comparative Example 9-4 in which a branched polymer was used could not attain a sufficient tensile strength due to the branched structure.

The sample in Comparative Example 9-5 containing a large amount of residual Sn caused depolymerization during spinning to extremely reduce spinning work efficiency.

The sample in Comparative Example 9-6 having a lower polymer viscosity failed in obtaining a sufficient tensile strength, while the sample in Comparative Example 9-7 having a higher polymer viscosity was forced to elevate the spinning temperature to cause heat decomposition of the polymer during spinning, thereby making it impossible to obtain a filament nonwoven fabric having a sufficient tensile strength.

A polymer having a higher melting point is used in the sheath component in Comparative Example 9-8. The filaments were not partially fused by hot rolling due to the high melting point of the sheath component to generate fluff in the filament spun-bond fabric, thereby causing poor productivity. Consequently, a filament nonwoven fabric having a sufficient tensile length could not be obtained.

TABLE 9-3

|  | Example | | Comparative Example | |
|---|---|---|---|---|
| No. 9- | 4 | 5 | 8 | 9 |
| core-to-sheath area ratio | 1:1 | 2:1 | 1:1 | 1:1 |
| L-isomer (%) in core PLA | 98.3 | 98.6 | 98.5 | 98.6 |
| blend ratio of the sheath (%) | 20 | 40 | 5 | 70 |
| Relative viscosity ηrel | 3.1 | 2.9 | 2.9 | 2.8 |
| content of residual Sn (ppm) | 13 | 18 | 13 | 16 |
| branched structure | Non | Non | Non | Non |
| longitudinal tensile strength (N) | 84.2 | 88.2 | 15.6 | — |
| productivity | o | o | x | x |

The blend ration of the polymer (trade name: Bionole, melting point 110° C.) as a sheath component, prepared by cross-linking a polybutylene succinate polymer synthesized from 1,4-butanediol and succinic acid by urethane bonds, is changed as shown in Table 9-3. While there were no problems in the blend ratio within the range of the present invention (Examples 9-4 and 9-5), the nonwoven fabric was fused on the hot-roll to make production impossible in the Comparative Example 9-9 in which the blending ratio was increased. In Comparative Example 9-8 in which the blending ratio was reduced, on the other hand, the filaments were not partially fused with each other to create fluffs in the nonwoven fabric.

Figure 1:
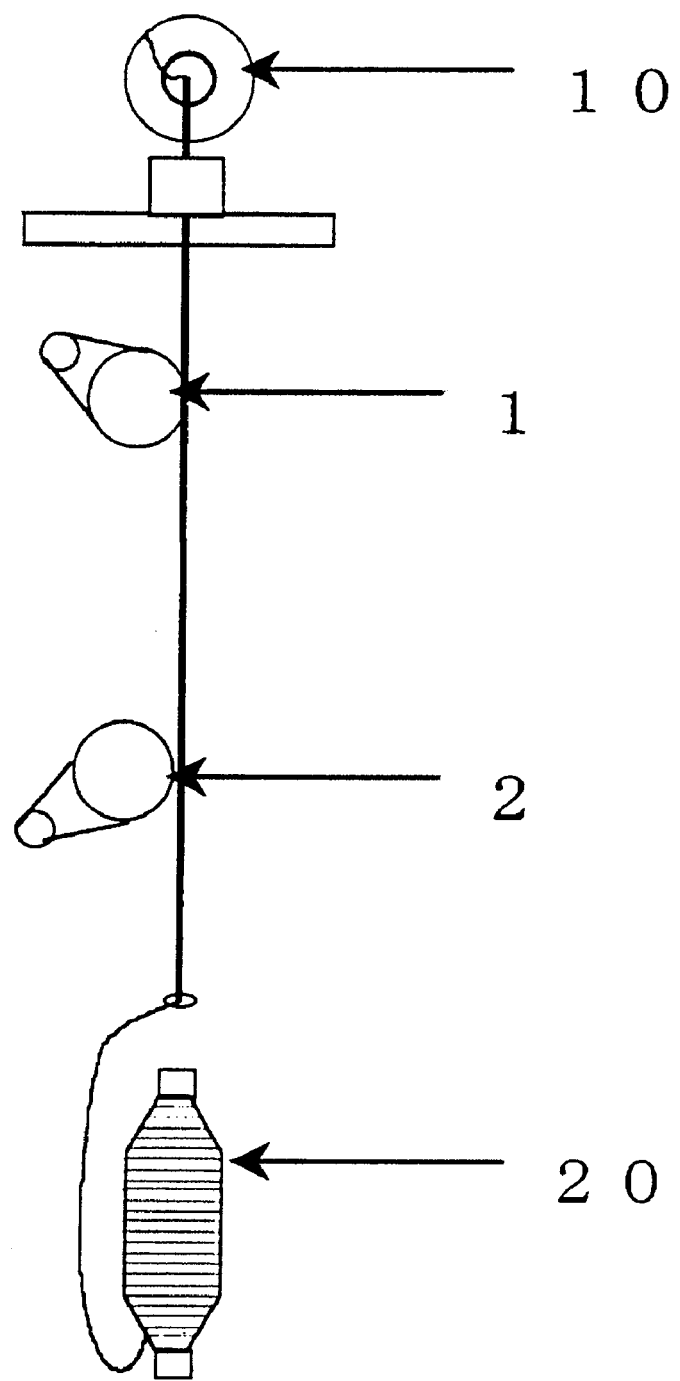
FIG. 1 schematically illustrates the drawing process according to the present invention.
Figure 2:
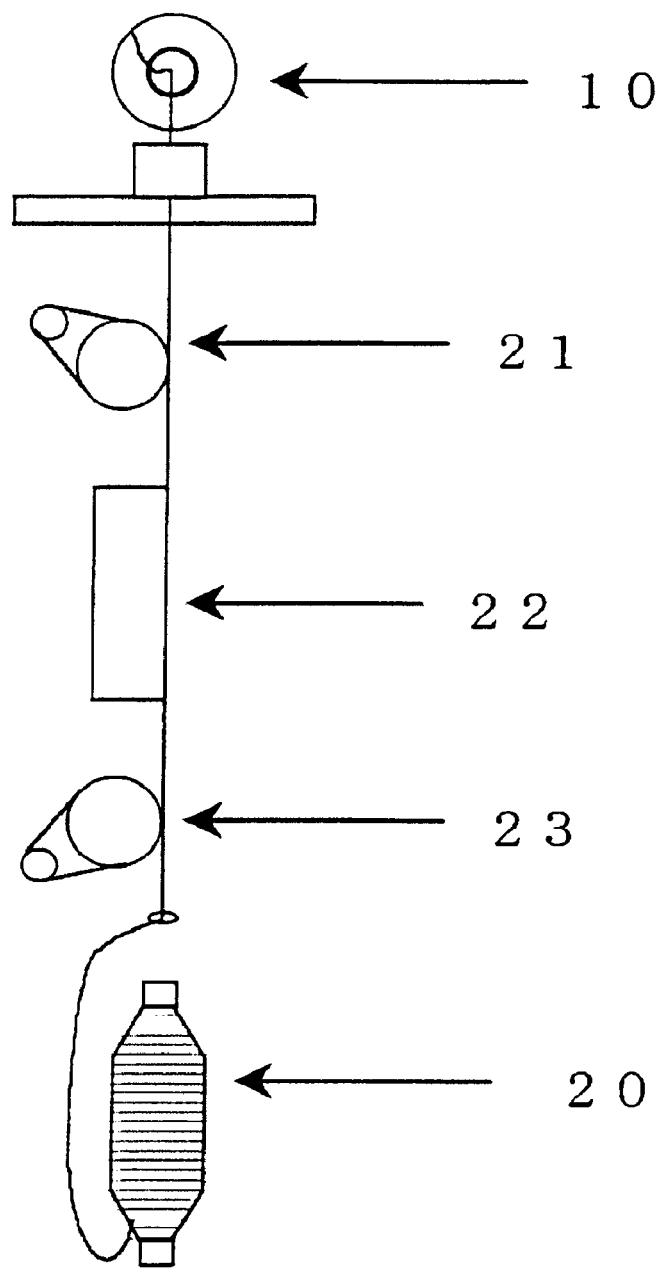
FIG. 2 schematically illustrates the conventional drawing process.

Reference Numerals
1 roller heater
2 roller heater
10 non-drawn fiber
20 drawn fiber
21 roller heater
22 plate heater
23 cold roller

INDUSTRIAL APPLICABILITY

The present invention provides a textile product being excellent in work efficiency and having excellent properties of the fiber comprising polylactic acid that is free from practical problems for industrial production, and a process for producing the textile product.

The invention claimed is:

1. A multifilament yarn comprising a linear polylactic acid resin with a relative viscosity ηrel of 2.7 to 3.9, a Sn content of 0 to 30 ppm, a residual monomer content of 0 to 0.5% by weight, prepared from lactic acid monomers wherein at least 98 mol % of the lactic acid is an L-isomer, and wherein said yarn has a tensile strength of 3.9 cN/dtex or more and a contraction ratio in boiling water of 12% or less, and an inert content of less than 3%.

2. A multifilament yarn comprising a linear polylactic acid resin with a weight average molecular weight Mw in the range of 120,000 to 220,000, a number average molecular weight Mn in the range of 60,000 to 110,000, a Sn content of 0 to 30 ppm, a residual monomer content of 0 to 0.5% by weight, prepared from lactic acid monomers wherein at least 98 mol % of the lactic acid is an L-isomer, and wherein said yarn has a tensile strength of 3.9 cN/dtex or more and a contraction ratio in boiling water of 12% or less, and an inert content of less than 3%.

3. A multifilament yarn according to claim 1 having a birefringence, Δn, of 0.030 or more, and a thermal stress peak temperature of 85° C. or more.

4. A process for producing a polylactic acid resin multifilament yarn using a linear polylactic acid resin with a relative viscosity ηrel of in the range of 2.7 to 3.9, and an inert content of less than 3% prepared from lactic acid monomers wherein at least 98 mol % of the lactic acid is an L-isomer, and wherein the resin contains 0 to 30 ppm of Sn and 0 to 0.5% by weight of residual monomer wherein the process steps comprise: spinning the resin at a speed in the range of 3,000 m/min to 5,000 m/min; drawing at a draw magnification factor 1.3 times or more at a temperature in the range of 100° C. to 125° C.; and heat-setting at a temperature in the range of 125° C. to 150° C.

5. A process for producing a polylactic acid multifilament yarn, with an inert content of less than 3%, using a linear polylactic acid resin with a weight average molecular weight Mw in the range of 120,000 to 220,000 and a number average molecular weight Mn in the range of 60,000 to 110,000, prepared from lactic acid monomers wherein at least 98 mol % of the lactic acid is an L-isomer, and wherein the resin contains 0 to 30 ppm of Sn and 0 to 0.5% by weight of monomer wherein the process steps comprise: spinning the resin at a speed in the range of 3,000 m/min to 5,000 m/min; drawing at a draw magnification factor of 1.3 times or more at a temperature in the range of 100° C. to 125° C.; and heat-setting at a temperature in the range of 125° C. to 150° C.

6. A process for producing polylactic acid multifilament yarn using the polylactic acid resin according to claim 1 wherein drawing is between a first heated roller (1) and a second heated roller (2) followed by heat-setting with the second heated roller (2).

* * * * *